United States Patent
Yang et al.

(10) Patent No.: US 9,112,605 B2
(45) Date of Patent: Aug. 18, 2015

(54) DUAL-POLARIZATION INTERFEROMETRIC OPTICAL SIGNAL-TO-NOISE RATIO MONITOR

(71) Applicant: Fujitsu Limited, Kanagawa (JP)

(72) Inventors: Jeng-Yuan Yang, Garland, TX (US);
Youichi Akasaka, Allen, TX (US);
Motoyoshi Sekiya, Richardson, TX (US); Takuji Maeda, Kawasaki (JP);
Hiroki Ooi, Kawasaki (JP); Satoru Okano, Yokohama (JP)

(73) Assignee: Fujitsu Limited, Kawasaki-shi (JP)

( * ) Notice: Subject to any disclaimer, the term of this patent is extended or adjusted under 35 U.S.C. 154(b) by 122 days.

(21) Appl. No.: 13/920,308

(22) Filed: Jun. 18, 2013

(65) Prior Publication Data

US 2014/0369678 A1 Dec. 18, 2014

(51) Int. Cl.
*H04B 10/08* (2006.01)
*H04B 10/079* (2013.01)
*H04B 10/2507* (2013.01)

(52) U.S. Cl.
CPC ...... *H04B 10/07953* (2013.01); *H04B 10/2572* (2013.01)

(58) Field of Classification Search
CPC ............... H04B 10/07953; H04B 10/07957; H04B 10/2569; H04B 10/2572
USPC ................................. 398/25–27, 159
See application file for complete search history.

(56) References Cited

U.S. PATENT DOCUMENTS

| | | | | |
|---|---|---|---|---|
| 5,311,346 A | * | 5/1994 | Haas et al. | ..................... 398/146 |
| 2007/0297043 A1 | | 12/2007 | Kao et al. | |
| 2009/0285585 A1 | * | 11/2009 | Larikova et al. | ............... 398/208 |
| 2010/0067903 A1 | | 3/2010 | Brodsky et al. | |
| 2010/0322622 A1 | | 12/2010 | Shukunami et al. | |

(Continued)

FOREIGN PATENT DOCUMENTS

| | | | | |
|---|---|---|---|---|
| EP | 1 432 150 A2 | 6/2004 | ............. | H04B 10/08 |
| EP | 1 432 150 A3 | 9/2005 | ............. | H04B 10/08 |

(Continued)

OTHER PUBLICATIONS

Lui et al.; "OSNR Monitoring Method for OOK and DPSK Based on Optical Delay Interferometer"; IEEE Photonics Technology Letters, vol. 19, No. 15; pp. 1172-1174, Aug. 1, 2007.

(Continued)

*Primary Examiner* — Dzung Tran
(74) *Attorney, Agent, or Firm* — Baker Botts L.L.P.

(57) ABSTRACT

The present disclosure includes a method of determining optical signal-to-noise ratio (OSNR) of a signal, comprising separating one polarization component from a plurality of polarization components in an optical signal, selecting one wavelength from a plurality of wavelengths in the optical signal, delaying a first portion of the one polarization component of the one wavelength of the optical signal, shifting a phase of the first portion by a first amount and the first amount plus pi radians, causing the first portion to interfere with a second portion, measuring a power of the interference of the first and second portions, receiving the power of the interference, and comparing the power of the interference when the phase is shifted by the first amount with the interference when the phase is shifted by the first amount plus pi radians to determine OSNR. The present disclosure also includes associated devices.

32 Claims, 12 Drawing Sheets

(56) References Cited

U.S. PATENT DOCUMENTS

2011/0311222 A1* 12/2011 Nakamura et al. ............ 398/26
2012/0155881 A1* 6/2012 Zhao et al. .................... 398/81
2012/0219285 A1* 8/2012 Dahan et al. ................... 398/26

FOREIGN PATENT DOCUMENTS

| | | | | |
|---|---|---|---|---|
| EP | 2 264 916 | A1 | 12/2010 | ............ H04B 10/08 |
| EP | 2 309 663 | A1 | 4/2011 | ............ H04B 10/08 |
| WO | 2009/062237 | A1 | 5/2009 | ............ H04B 10/08 |

OTHER PUBLICATIONS

Ducournau et al.; "The All-fiber MZI Structure for Optical DPSK Demodulation and Opotical PSBT Encoding" Systemics, Cybernetics and Informatics; vol. 4, No. 4; pp. 78-89, 2006.

European Search Report; Application No. 14164742.0, 7 pages, Nov. 6, 2014.

* cited by examiner

DUAL-POLARIZATION INTERFEROMETRIC OPTICAL SIGNAL-TO-NOISE RATIO MONITOR

TECHNICAL FIELD OF THE INVENTION

The present invention relates generally to optical communication networks and, more particularly, to dual-polarization interferometric optical signal-to-noise ratio (OSNR) monitors.

BACKGROUND

Telecommunications systems, cable television systems and data communication networks may use optical networks to rapidly convey large amounts of information between remote points. In an optical network, information may be conveyed in the form of optical signals through optical fibers. Optical fibers may comprise thin strands of glass capable of communicating the signals over long distances with very low loss.

One consideration in analyzing the effectiveness of communicating a signal is the optical signal-to-noise ratio (OSNR). This value may indicate the instantaneous quality of a signal. As a signal passes through a network, it may lose signal strength or may increase in noise, resulting in a decrease of the overall OSNR. If OSNR drops below a certain point, the signal may be unreadable at a desired destination. Thus, it may be desirable to measure OSNR.

OSNR may be represented by the relationship in Equation (1).

$$OSNR[dB] = 10 \times \log\left(\frac{P_{sig}}{P_{noise}}\right) \quad (1)$$

where $P_{sig}$ represents the power of the signal to be measured (for example, the magnitude of signal strength), and $P_{noise}$ represents the power of the noise. For example, for optical signals, this may represent the intensity of light.

Optical networks often employ modulation schemes to convey information in the optical signals over optical fibers. Such modulation schemes may include phase-shift keying ("PSK"), frequency-shift keying ("FSK"), amplitude-shift keying ("ASK"), and quadrature amplitude modulation ("QAM").

In PSK, the information carried by the optical signal may be conveyed by modulating the phase of a reference signal, also known as a carrier wave. The information may be conveyed by modulating the phase of the signal itself using differential phase-shift keying ("DPSK").

In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK ("BPSK" or "2-PSK") using two phases at 0° and 180° (or 0 and $\pi$) on the constellation diagram; or quadrature PSK ("QPSK", "4-PSK", or "4-QAM") using four phases at 0°, 90°, 180°, and 270° (or 0, $\pi/2$, $\pi$, and $3\pi/2$). Phases in such signals may be offset. This may be extended, for example, up to 16-QAM, using sixteen phases. These various signals (for example, 2-PSK or 16-QAM) may be arranged in one circle on the constellation diagram.

M-PSK signals may also be polarized using techniques such as dual-polarization QPSK ("DP-QPSK"), wherein separate m-PSK signals are multiplexed by orthogonally polarizing the signals.

SUMMARY

In one embodiment, the present disclosure includes a device for measuring optical signal-to-noise ratio (OSNR) of an optical signal comprising a plurality of polarization components and a plurality of wavelengths, the device comprising a wavelength treatment device configured to select one wavelength from the plurality of wavelengths in the optical signal. The device further comprises a polarization treatment device configured to receive the one wavelength of the optical signal from the wavelength treatment device, and separate one polarization component from the plurality of polarization components in the one wavelength of the optical signal. The device additionally comprises an interferometer configured to delay a first portion of the one polarization component of the one wavelength of the optical signal, shift a phase of the first portion by a first amount and the first amount plus pi radians, cause the first portion to interfere with a second portion of the one polarization component of the one wavelength of the optical signal, and output interference of the first portion and second portion. The device additionally includes a power meter configured to receive the output of the interferometer and measure a power of the output of the interferometer. The device further comprises a controller configured to receive the measured power of the output of the interferometer and determine OSNR of the one wavelength of the one polarization component of the optical signal by comparing the power of the output of the interferometer when the interferometer shifts the phase by the first amount with the output of the interferometer when the interferometer shifts the phase by the first amount plus pi radians.

In an alternative embodiment, the present disclosure includes a device for measuring optical signal-to-noise ratio (OSNR) of an optical signal comprising a plurality of polarization components and a plurality of wavelengths, the device comprising a polarization treatment device configured to separate one polarization component from the plurality of polarization components in the optical signal. The device also comprises a wavelength selective switch configured to receive the one polarization component of the optical signal, select one wavelength from the plurality of wavelengths in the one polarization component of the optical signal, delay a first portion of the one polarization component of the one wavelength of the optical signal, shift a phase of the first portion by a first amount and the first amount plus pi radians, cause the first portion to interfere with a second portion of the one polarization component of the one wavelength of the optical signal, and output interference of the first portion and second portion. The device further includes a power meter configured to receive the output of the wavelength selective switch and measure a power of the output of the wavelength selective switch. The device also includes a controller configured to receive the measured power of the output of the wavelength selective switch and determine OSNR of the one wavelength of the one polarization component of the optical signal by comparing the power of the output of the wavelength treatment component when the wavelength treatment component shifts the phase by the first amount with the output of the wavelength selective switch when the wavelength selective switch shifts the phase by the first amount plus pi radians.

In a further embodiment, the present disclosure includes a method of determining optical signal-to-noise ratio (OSNR) of an optical signal comprising a plurality of wavelengths and a plurality of polarization components, the method comprising separating one polarization component from the plurality of polarization components in the optical signal at a polarization treatment component and selecting one wavelength from the plurality of wavelengths in the optical signal at a wavelength treatment component. The method further comprises delaying a first portion of the one polarization component of the one wavelength of the optical signal, shifting a phase of the first portion by a first amount, causing the first portion to interfere with a second portion of the one polarization component of the one wavelength of the optical signal, measuring a power of the interference of the first and second portions of the one polarization component of the one wavelength of the optical signal at a power meter, and receiving at a controller the power of the interference. The method additionally comprises delaying the first portion of the one polarization component of the one wavelength of the optical signal, shifting the phase of the first portion by the first amount plus pi radians, causing the first portion to interfere with the second portion of the one polarization component of the one wavelength of the optical signal, measuring the power of the interference of the first and second portions of the one polarization component of the one wavelength of the optical signal at the power meter, and receiving at the controller the power of the interference. The method further comprises determining OSNR by comparing the power of the interference when the phase is shifted by the first amount with the interference when the phase is shifted by the first amount plus pi radians.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

The present disclosure relates to measuring optical signal-to-noise ratio (OSNR). In some embodiments, a single polarization component may be separated from an optical signal carrying more than one polarization component, where each polarization component may carry a different sub-signal within the optical signal. A particular wavelength may also be separated from a plurality of wavelengths in the optical signal, where multiple sub-signals may also be carried in various wavelengths. Once the particular polarization component and wavelength are separated, the OSNR may be measured using a delay interferometer or other devices operating on similar principles. In other words, the OSNR may be measured by splitting the optical signal and delaying and phase-shifting one portion of the signal and causing a copy of the original signal and the delayed/phase-shifted signal to interfere with each other, outputting the constructive interference. The destructive interference is then measured by delaying and phase-shifting, with an additional $\pi$ phase shift, one portion of the signal and causing a copy of the original signal and the delayed/phase-shifted plus $\pi$ to interfere with each other. The constructive and destructive interferences are then used to calculate the OSNR.

Figure 1:
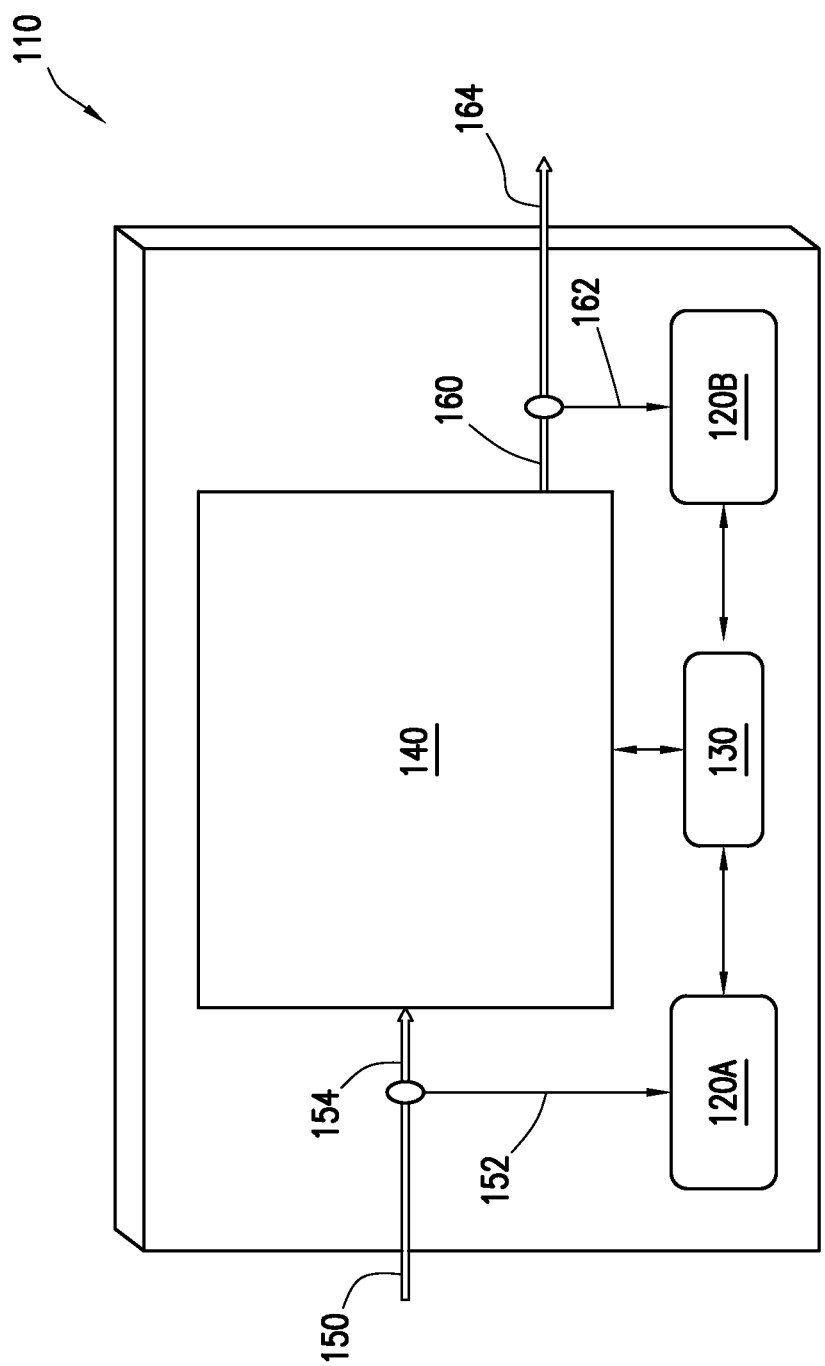
FIG. 1 illustrates an example embodiment of a system for measuring optical signal-to-noise ratio (OSNR), in accordance with the present disclosure.

FIG. 1 illustrates an example embodiment of a network where it may be desirable to measure OSNR. The network may include a node 110 that may comprise an OSNR monitor device 120, a node controller 130, and a switching device 140. Node 110 may receive an incoming signal 150, and may include a signal splitter to split incoming signal 150 into a major component 154 and a minor component 152. Node 110 may also include a signal splitter to split an outgoing signal 160 into a minor component 162 and a major component 164.

The network may include one or more transmission media operable to transport one or more signals communicated by components of the network. The components of the network, coupled together by transmission media, may include a plurality of network elements or nodes 110. In the network, each node 110 may be coupled to one or more other nodes 110. However, any suitable configuration of any suitable number of nodes 110 may create the network. The network may be configured as a shared mesh network, ring network, a point-to-point network, or any other suitable network or combination of networks. The network may be used in a short-haul metropolitan network, a long-haul inter-city network, or any other suitable network or combination of networks. The network may represent all or a portion of a short-haul metropolitan network, a long-haul inter-city network, and/or any other suitable network or combination of networks.

Each transmission medium may include any system, device, or apparatus configured to communicatively couple nodes 110 to each other and communicate information between corresponding nodes 110. For example, a transmission medium may include an optical fiber, an Ethernet cable, a T1 cable, copper cable, a WiFi signal, a Bluetooth signal, or other suitable medium. In embodiments of the present disclosure, optical fibers may include thin strands of glass capable of communicating signals over long distances with very low loss. Optical fibers may include any suitable type of fiber, such as a Single-Mode Fiber (SMF), Enhanced Large Effective Area Fiber (ELEAF), or a TrueWave® Reduced Slope (TW-RS) fiber. The capacity of network 100 may include, for example, 40 Gbit/s, 100 Gbit/s, 400 Gbit/s, or 1 Tbit/s. Information may be transmitted and received through the network by modulation of one or more wavelengths of light to encode the information on the wavelength. Additionally, information may be transmitted and received by modulation of one or more polarizations of light to encode the information in various polarization components, for example x-polarization and y-polarization components. In optical networking, a wavelength of light may also be referred to as a channel. Each channel may be configured to carry a certain amount of information through the network.

The network may communicate information or "traffic" over transmission media. Traffic may include information transmitted, stored, or sorted in the network. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 100 may be structured in any appropriate manner including, but not limited to, being structured in frames, packets, or an unstructured bit stream.

Node 110 may include any suitable system operable to transmit and receive traffic. In the illustrated embodiment, node 110 may be operable to transmit traffic directly to one or more other nodes and receive traffic directly from one or more other nodes. Node 110 may include any suitable arrangement of components operable to perform the operations of node 110. As an example, node 110 may include logic such as hardware, software, other logic, and/or any other suitable combination of the preceding. Logic may include any suitable device operable to execute instructions and manipulate data to perform operations, for example, a processor, microprocessor, field-programmable gate array (FPGA), or application specific integrated circuit (ASIC). Node controller 130 may be the implementation of the logic for node 110. Node 110 may include an interface operable to receive input, send output, process the input and/or output, or any combination of the preceding. An interface may include ports, conversion software, or both. Node 110 may include memory, such as, logic operable to store and facilitate retrieval of information. Memory may include Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding, and/or any other suitable components. Node 110 may be implemented as an electronic device.

While node 110 may be illustrated as receiving input signal 150 from the left and outputting signal 160 to the right, it will be appreciated that this is merely for convenience and node 110 may likewise communicate from right to left, or in any number of degrees or directions.

In certain embodiments of the present disclosure, node 110 may be configured to transmit optical signals through the network in specific wavelengths or channels, as well as specific polarizations. For example, the optical signals may include dual-polarization components, x-polarization and y-polarization components orthogonal to each other. These axes may be rotated or shifted to varying degrees. Node 110 may include any system, apparatus or device configured to convert an electrical signal into an optical signal and transmit the optical signal. For example, node 110 may comprise a laser and a modulator configured to receive electrical signals and modulate the information contained in the electrical signals onto a beam of light produced by the laser at a particular wavelength and/or polarization and transmit the beam carrying the signal throughout the network. Node 110 may include client cards, switches, such as, wavelength selective switches, optical transport network (OTN) switches, line cards, one or more multiplexers, one or more amplifiers, one or more reconfigurable optical add/drop multiplexers (ROADM), and/or one or more receivers. For example, node 110 may include switching device 140 that may be any system or device configured to route major component 154 of incoming signal 150 to other nodes in the network. Node controller 130 may comprise logic to direct and control switching device 140.

As shown in FIG. 1, node 110 may receive an input signal 150. Node 110 may include a signal splitter configured to split input signal 150 into a major component 154 and a minor component 152. In some embodiments, major component 154 may include 90-95% of the power of the optical signal, and minor component 152 may include 5-10% of the power of the optical signal. In other embodiments, major component 154 may include 95-99% of the power of the optical signal, and minor component 152 may include 1-5% of the power of the optical signal. Major component 154 may be routed within node 110 to switching device 140, and may then be routed out of node 110 to other areas of network 100. Minor component 152 may be routed within node 110 to OSNR monitor device 120A.

In like manner, node 110 may include a signal splitter configured to split output signal 160 into a major component 164 and a minor component 162. In some embodiments, major component 164 may include 90-95% of the power of the optical signal, and minor component 162 may include 5-10% of the power of the optical signal. In other embodiments, major component 164 may include 95-99% of the power of the optical signal, and minor component 162 may include 1-5% of the power of the optical signal. Major component 164 may be routed external to node 110, for example, to another node of the network. Minor component 162 may be routed within node 110 to OSNR monitor device 120B. While OSNR monitor devices 120A and 120B are shown as separate components, it will be appreciated that the same physical components may be used. For example, both minor components 152 and 162 may be routed to the same components. In some embodiments, only one of OSNR monitor devices 120A and 120B may be present. For example, node 110 may only monitor OSNR on incoming signals 150 or outgoing signals 160. Further, while two OSNR monitor devices 120 may be illustrated, it will be appreciated that many more OSNR monitor devices 120 may be included within node 110. Additionally, while the remainder of examples may refer to minor component 152, it will be appreciated that minor component 162 may also be used, or any other of a variety of optical signals.

While OSNR monitor device 120 may be illustrated as part of node 110, it will be appreciated that OSNR monitor device 120 may be implemented in any of a variety of locations or devices throughout network 100. For example, and in no way limiting, OSNR monitor device 120 may be incorporated in one or more line cards, as a sub-component to a switching device, as sub-component to an add-drop multiplexer, or any combinations thereof.

Figure 2A:
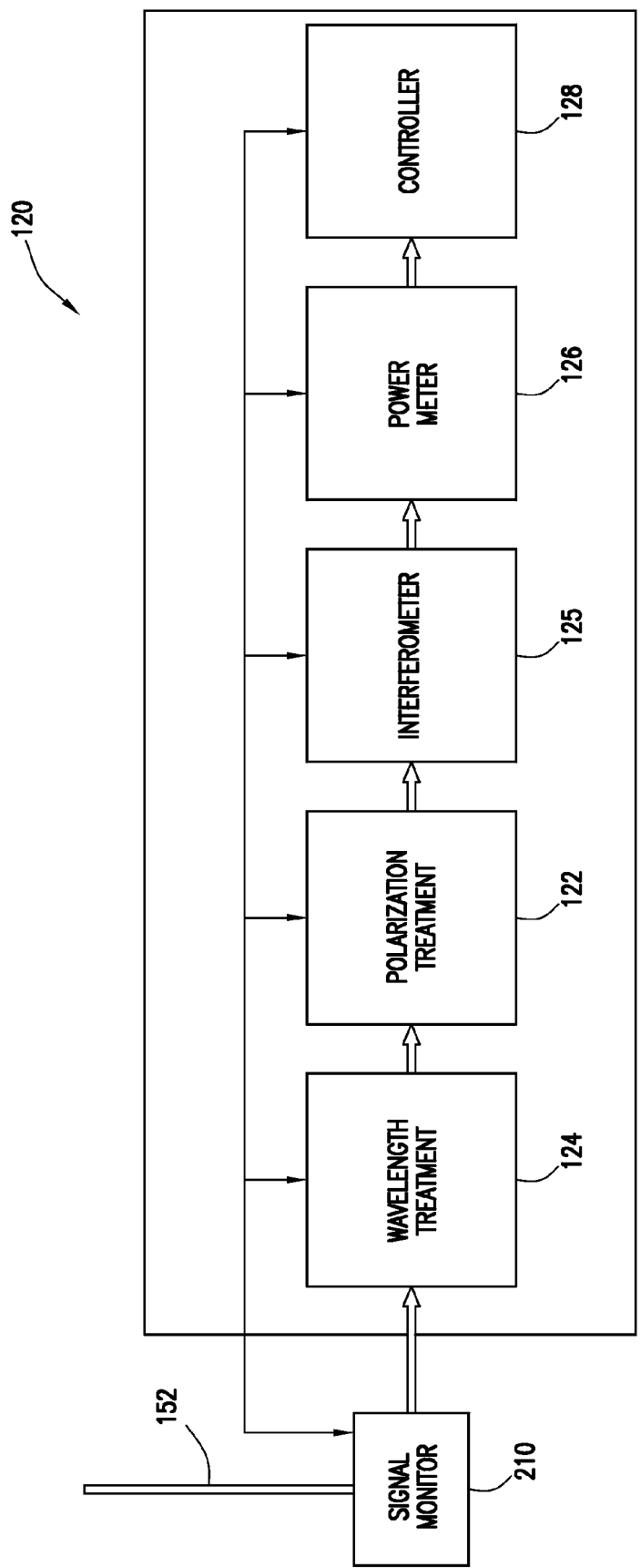
FIGS. 2A and 2B illustrate example devices for measuring OSNR, in accordance with the present disclosure.

FIG. 2A illustrates an example embodiment of a device for monitoring optical signal-to-noise ratio (OSNR). As shown in FIG. 2A, an OSNR monitor device 120 may receive an optical signal, for example, minor component 152 of optical signal 150 received at node 110. Minor component 152 may be monitored by signal monitor device 210 prior to receiving minor component 152 at OSNR monitor device 120. OSNR monitor device 120 may include a wavelength treatment device 124, a polarization treatment component 122, an interferometer 125, a power meter 126, and a controller 128. Each of these components may be in communication with any other of the components, and each of these components may pass minor component 152 among or between any other components, either with or without any treatment, filtering, or other handling of minor component 152. For example, wavelength treatment device 124 may filter out a particular wavelength of the optical signal, and then pass the filtered wavelength to polarization treatment device 122. Polarization treatment device 122 may filter or otherwise separate out one polarization component of minor component 152 and then pass the filtered portion of the optical signal to interferometer 125. Interferometer 125 may perform delaying or phase-shifting of the optical signal to arrive at the constructive or destructive interference with a copy of the optical signal. The optical signal may then be passed to power meter 126. Power meter may measure the strength of the outputs of interferometer 125 and may pass that information to controller 128.

Polarization treatment device 122 may be any system, device, circuitry, or combination thereof operable to separate polarization components and/or tune polarization of an optical signal, for example, selecting a single polarization component from a plurality of polarization components within an optical signal. In some embodiments, polarization treatment device 122 may be configured to rotate, align, or fix the polarization of an optical signal. Polarization treatment device 122 may be configured to split minor component 152 into two separate pieces, modify one piece a certain way, and modify the other piece another. For example, polarization treatment device 122 may split minor component 152 into x-polarization and y-polarization components that may be individually tuned, analyzed, and monitored for OSNR. Polarization treatment device 122 may be implemented as a variety of sub-components that perform any of the desired tasks. For example, polarization treatment device 122 may comprise any of a tunable polarization controller, a polarization beam splitter (for example a fixed axes beam splitter), a polarizer (for example a fixed-axis polarizer), a polarization stabilizer (for example a fixed axes stabilizer), a tunable polarizer, or any combination thereof, including combinations of more than one of the same above-mentioned components (for example two tunable polarizers).

Wavelength treatment device 124 may be any system, device, circuitry, or combination thereof operable to perform at least one of selecting a single wavelength from a plurality of wavelengths within an optical signal, delaying an optical signal, or shifting the phase of an optical signal. In some embodiments, wavelength treatment device 124 may split an incoming optical signal, for example, minor component 152, into two paths for separate handling, for example, for delaying and phase shifting. Wavelength treatment device 124 may be implemented as a variety of sub-components that perform any of the desired tasks. For example, wavelength treatment device 124 may comprise any of an optical tunable band pass filter, a delay interferometer, a 1×2 wavelength selective switch (i.e. a wavelength selective switch with one input and two outputs), a 1×1 wavelength selective switch (i.e. a wavelength selective switch with one input and one output), or any combination thereof, including combinations of more than one of the same above-mentioned components (for example two delay interferometers).

Interferometer 125 may be any system, device, circuitry, or combination thereof operable to delay an optical signal, shift the phase of an optical signal, and cause optical signals to interfere with each other. In some embodiments, interferometer 125 may split an incoming optical signal, for example, minor component 152, into two paths for separate handling, for example, for delaying and phase shifting. Interferometer 125 may be implemented as a variety of sub-components that perform any of the desired tasks. In some embodiments, interferometer may have a portion that is variable for both phase-shifting and for delay. Such a variable portion may be under the direction of controller 128. A first portion of an optical signal input to interferometer 125 may be delayed and phase-shifted by a first amount and caused to interfere with a copy of the optical signal to cause constructive interference. The constructive interference may be an output of interferometer 125. A second portion of an optical signal input to interferometer 125 may be delayed and phase-shifted, but phase-shifted by the first amount an additional $\pi$ radians, and caused to interfere with a copy of the optical signal to cause destructive interference. The destructive interference may be an output of interferometer 125. The amount of delay and/or phase-shifting may be determined by the controller based on a variety of factors, including modulation format, bandwidth (for example, the speed of the network), wavelength to be analyzed, or wavelength drift.

Power meter 126 may be any system, device, circuitry, or combination thereof operable to measure the magnitude of a given signal. For example, power meter 126 may be a photodiode that generates current in accordance with reception-light power of an optical signal being passed to power meter 126. OSNR monitor device 120 may include multiple power meters 126. For example, OSNR monitor device 120 may have two power meters for each delay interferometer.

Controller 128 may be any system, device, circuitry, or combination thereof operable to calculate, determine, or measure OSNR based on received inputs from any of polarization treatment device 122, wavelength treatment device 124, power meter 126, or combinations thereof. Controller 128 may include a processor, microprocessor, microcontroller, DSP, ASIC, or any other digital or analog circuitry for executing the instructions resident upon a computer-readable medium. Controller 128 may also include computer-readable medium for storage of instructions to facilitate controller 128 performing its functions, or for storage of a determined OSNR or inputs received from other components of node 110 and/or OSNR monitor device 120 to facilitate operation of OSNR monitor device 120. In some embodiments, controller 128 may provide direction or instructions to other components of OSNR monitor device 120. For example and in no way limiting, controller 128 may direct polarization treatment device 122 to rotate the polarization of minor component 152 in a certain way and then select out the x-polarization component of minor component 152. As an alternative illustrative example, controller 128 may direct wavelength treatment device 124 to filter out all of minor component 152 besides a particular wavelength. As a further example, controller 128 may direct interferometer 125 with respect to the amount of delay to be used and an amount of phase shifting to occur.

Signal monitor device 210 may be any system, device, circuitry, or combination thereof operable to monitor an optical signal being monitored at OSNR monitor device 120. For example, signal monitor device 210 may be operable to monitor modulation format, bandwidth (for example, the speed of the network traffic), wavelength to be analyzed, or wavelength drift (for example, that caused by temperature variations or laser errors). Signal monitor device 210 may be in communication with controller 128 to provide any or all of the information obtained by signal monitor device 210. This information may assist controller 128 in controlling the various components of OSNR monitor device 120 or in determining OSNR for an optical signal. For example, controller 128 may modify the phase-shift of interferometer 125 based on the modulation format of the signal, or may modify the amount of delay based on the speed of the network.

While signal monitor device 210 may be shown as being a passive monitor to an incoming signal that simply passes through the signal, it will be appreciated that signal monitor device 210 may include a splitter (for example, a 3 dB splitter) that takes a portion of an optical signal to measure or monitor a desired characteristic, which may terminate that portion of the optical signal, and may pass the other portion of the signal along to OSNR monitor device 120. Alternatively, it will be appreciated that such monitoring may be done elsewhere within node 110 or elsewhere within the network, and any desired information regarding a desired characteristic (for example, bandwidth) may be sent to OSNR monitor device 120.

While FIG. 2A illustrates polarization treatment device 122, wavelength treatment device 124, interferometer 125, power meter 126, and controller 128 in a particular order, it will be appreciated that this order may be changed and modified, or sub-components of the various elements may be rearranged. For example, a sub-component of wavelength treatment 124 may be located before polarization treatment device 122, and further sub-components of wavelength treatment device 124 may then be located after polarization treatment device 122.

By using an OSNR monitor device 120 as shown in FIG. 2A, real time calculation of OSNR may be achieved. For example, as signal 150 enters node 110 and is handled by switching device 140, OSNR monitor device 120 may be determining OSNR for the optical signal being routed and handled by switching device 140. While there may be minor variations in timing of handling vs. determination of OSNR by virtue of processing and calculating times as opposed to handling and routing times, the determination may occur essentially in real time.

Figure 2B:
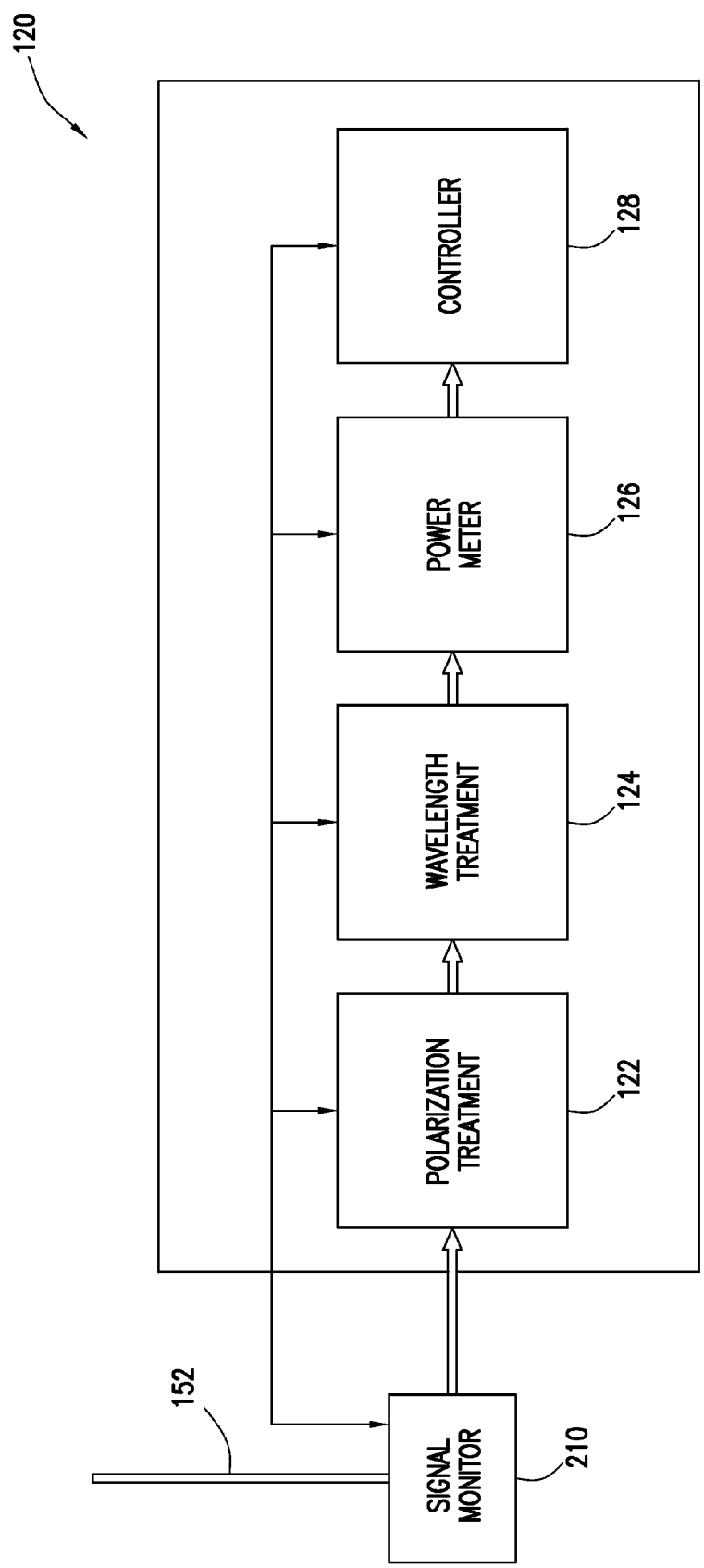

FIG. 2B illustrates an alternative embodiment of OSNR monitor device 120. As shown in FIG. 2B, rather than utilizing interferometer 125, OSNR monitor device 120 may utilize a particular form of wavelength treatment device 124 that also performs the functions of interferometer 125 of FIG. 2A. For example, in some embodiments, as described above, wavelength treatment device 124 may include a wavelength selective switch that may be configured to perform wavelength filtering, delaying, phase-shifting, or causing signals to interfere with each other, or any combinations thereof.

In some embodiments, OSNR monitor device 120 may operate on principles of interferometric monitoring. A description of such principles may be found in U.S. patent application Ser. No. 12/181,613, which is incorporated by reference herein in its entirety. By way of illustrative example, and in no way limiting, the following discussion may describe one embodiment of operation of a delay interferometer. As described below, a delay interferometer may be implemented as at least part of wavelength treatment device 124.

A delay interferometer may divide a received optical signal into two optical paths. Then, the delay interferometer may cause the divided optical signals to be supplied through the different optical paths and cause the signals to interfere with each other using a difference between the two optical paths. The signals may then be output and measured at one or more power meters 126. An example of a delay interferometer includes a Mach-Zehnder (MZ) interferometer.

Power meters 126 may be implemented as photodiodes, which generate current in accordance with reception-light power of the input optical signal. For example, two power meters 126 may generate a current in accordance with the reception-light power of the optical signals supplied from the delay interferometer so as to determine presence or absence of the optical signal and intensity of the optical signal and obtain the optical signal. In other words, a component of the intensity-modulation optical signal which is coherent light or a component of an optical signal which has not been subjected to phase modulation may be mainly output to one of the power meters 126, and a noise component which is noncoherent light is output to both of the power meters 126. Note that, in some embodiments, the component of the signal light is mainly received by a second power meter 126 and the noise component is received by both a first and the second power meters 126. That is, the reception-light power of the second power meter 126 is larger than the reception-light power of the first power meter 126. Specifically, the power meters 126 may output current in accordance with the optical powers of the two optical signals output from the delay interferometer. These measured optical powers may be represented by "P1 (mW) and P2 (mW)" of optical signals received by the two power meters 126. In some embodiments, these values may be achieved by averaging the reading at the power meters 126. These values may be passed to controller 128 to facilitate calculating or determining the OSNR of the signal.

A portion of wavelength treatment device 124 may select a particular bandwidth of wavelength to be analyzed. In some embodiments, this portion of wavelength treatment device 124 may occur before polarization treatment device 122. For example, a particular channel in the optical signal may be selected and the remainder of the optical signal may be filtered out. This bandwidth "B (nm)" which has been set in wavelength treatment device 124 may be passed to controller 128 to facilitate calculating or determining the OSNR of the signal at that bandwidth. While the term "Bandwidth" may be used, it will be appreciated that this may refer to a particular range of wavelengths within a broader range of wavelengths of an optical signal. For example, "Bandwidth" may refer to a 0.1 nm band of wavelengths within the full optical spectrum. Alternatively, rather than the term "bandwidth," the term wavelength may be used to refer to a particular band of wavelength to be analyzed. While the term wavelength may be used, it will be appreciated that this may refer to a range of wavelengths around or near the specified wavelength.

Controller 128 may utilize the bandwidth "B (nm)" from wavelength treatment device 124 and the optical powers "P1 (mW) and P2 (mW)" from power meters 126 in Equation (2) for a 0.1 nm band to calculate OSNR.

$$OSNR[dB] = 10 \times \log(P2 - P1) - 10\log\left(2 \times P1 \times \frac{0.1}{B}\right) \quad (2)$$

Alternatively, by way of another illustrative example, and in no way limiting, the following discussion may describe another embodiment of operation of a delay interferometer.

A controller 128 may control a delay time of a delay circuit included in a delay interferometer. For example, a user may input a delay time, and the input delay time may be sent to the delay circuit.

The delay interferometer may divide a signal into two signals and cause one of the signals that has been delayed by a predetermined time amount to interfere with the other of the signals that has not been delayed, and output the signals to power meters 126 that output current based on intensity of received light. For example, the delay interferometer may divide an optical signal into two signals to be supplied to two optical paths. Then, the delay interferometer may delay the optical signal of the first optical path by "τ" seconds, and may then cause the optical signals of the optical paths to interfere with each other, and then output the optical signals to the power meters 126. The delay interferometer may operate such that a first current is supplied to the first power meter 126 when a difference between optical phases of the two optical paths corresponds to "π" radian whereas a second current may be supplied to the second power meter 126 when the difference corresponds to "0" radian.

When the value "τ" is equal to "0 (second)," a current is substantially supplied only to the second power meter 126 since the optical phase difference is not generated between the two optical paths. When the value of "τ" is increased, a rate at which the optical phase difference corresponds to "π" relative to a preceding bit may be increased, and accordingly, the current supplied to the first power meter 126 may be increased. On the other hand, when the value "τ" may be equal to "1 bit (second)," that is, at a time of delay of 100%, the currents supplied to the first and second power meters 126 may be substantially equal to each other.

When a delay amount "τ" between the two optical paths corresponds to "1 bit (second)" and when an optical phase difference between the two optical paths corresponds to "π", the same amounts of current may be supplied to the power meters 126. That is, when an output phase of the first optical path and an output phase of the second optical path are shifted from each other by "1 bit (second)", the same amounts of currents may be supplied to the two power meters 126. On the other hand, when the delay amount "τ" between the two optical paths is larger than "0" and smaller than "1," e.g., when the delay amount "τ" is "0.75 bits (seconds)", that is, when an inter-symbol phase difference "τ" between the two optical paths is "0.75 bits (seconds)", the amount of the current supplied to the second power meter 126 may be larger than the amount of current supplied to the first power meter 126. That is, when an output symbol phase of the first optical path is shifted relative to an output symbol phase of the second optical path by "0.75 bits (seconds)", the amount of the current supplied to the second power meter 126 may be larger than the amount of the current supplied to the first power meter 126.

That is, as the delay amount "τ" between the two optical paths may be shifted from "1 bit (second)" to "0 bit (second)", the amount of the current supplied to the second power meter 126 may become larger than the amount of the current supplied to the first power meter 126, and when the delay amount "τ" between the two optical paths becomes "0 bit (second)", the current may be supplied only to the second power meter 126 since the optical phase difference between the two optical paths is not generated. Accordingly, in the signal light, the amounts of the currents supplied to the two power meters 126 may depend on the delay amount "τ" and the optical phase difference between the two optical paths. In some embodiments, phase shifting may be done along at least one of the paths in the delay interferometer.

The delay time of the delay interferometer may be set so that a delay time difference may be obtained such that interference of the noise does not occur. That is, the optical signals of the two optical paths interfere with each other in the delay interferometer since the optical signal has coherency, and therefore, a difference between optical levels of the two power meters 126 may be generated in accordance with a state of the interference. However, since the noise does not have coherency, the two power meters 126 receive noise with substantially the same optical levels. In other words, noise light may have substantially the same optical levels at both power meters 126, and signal light may have different levels detected by the two power meters 126 in accordance with the interference state of the delay interferometer.

As described above, the power measured at the two power meters 126 may depend on the delay amount "τ" between the two optical paths A and B (i.e., a rate of a delay time for one bit time) and the optical phase difference. On the other hand, since the noise light does not have phase information and coherency, the noise light may not depend on the delay amount "τ," and the currents supplied to the two optical paths may be equal to each other. Accordingly, characteristics of the differential phase shift keying method representing that "amounts of the currents supplied to the two power meters may be different from each other when the delay amount 'τ' is equal to or smaller than 1 bit (second)" and "the noise does not depend on the delay amount 'τ' and amounts of the currents supplied to the two power meters are equal to each other" are used for the OSNR calculation (measurement).

For example, the noise received by the optical detectors two power meters 126 may be fixed to "0.5" irrespective of the delay time except for a case where the rate "t" of the delay time for one bit time is equal to "0." On the other hand, as for phase modulation signal light beams received by the two power meters 126, as the rate "t" of the delay time relative to one bit time is increased from "0" to "1", a reception-light power of the second power meter 126 may become smaller (the current supplied to the power meter 126 is reduced) and a reception-light power of the first power meter 126 becomes larger (the current supplied to the second power meter 126 is increased). As a result, when the rate "t" corresponds to "1", the reception-light powers of the two power meters 126 are equal to each other, that is, "0.5". Accordingly, when the optical powers received by the two power meters 126 are denoted by "P1 (mW) and P2 (mW)," an optical signal power may be denoted by "$P_{sig}$ (mW)," and noise total power may be denoted by "$P_{noise}$ (mW)," Equations (3) and (4) below may be satisfied.

$$P1 = 0.5 \times t \times P_{sig} + 0.5 \times P_{noise} \tag{3}$$

$$P2 = (1 - 0.5 \times t) \times P_{sig} + 0.5 \times P_{noise} \tag{4}$$

Note that, "t" denotes the rate of the delay time for one bit time, and accordingly, when the optical signal power $P_{sig}$ is calculated using Equations (3) and (4), Equation (5) is satisfied. Furthermore, according to Equation (6), the noise power $P_{noise}$ is represented by Expression (7).

$$P_{sig} = \frac{P2 - P1}{1 - t} \tag{5}$$

$$P1 + P2 = P_{sig} + P_{noise} \tag{6}$$

$$P_{noise} = P1 + P2 - P_{sig} = P1 + P2 - \frac{P2 - P1}{1 - t} \tag{7}$$

When a band of the noise included in Equation (7) is set to "B (nm)" and a noise power of "0.1 nm" band is calculated ("$P_{noise,\ 0.1\ nm}$"), Equation (8) may be obtained. Furthermore, according to Equations (1), (5), and (8), OSNR may be calculated using Equation (9).

$$P_{noise, 0.1\ nm} = \left(P1 + P2 - \frac{P2 - P1}{1 - t}\right) \times \frac{0.1}{B} \tag{8}$$

$$OSNR[\text{dB}] = \tag{9}$$
$$10 \times \log\left(\frac{P2 - P1}{1 - t}\right) - 10 \times \log\left[\left(P1 + P2 - \frac{P2 - P1}{1 - t}\right) \times \frac{0.1}{B}\right]$$

Wavelength treatment module 124 may determine the bandwidth band "B" that may be analyzed, and may supply this value to controller 128 to facilitate determination of OSNR. The delay interferometer may divide an optical signal into two signals to be supplied to the two optical paths, and may delay the signal supplied to the first optical path by the predetermined delay time amount. In some embodiments, this time may be determined by controller 128. Then, the delay interferometer may cause the signals output from the two optical paths to interfere with each other, and outputs the signals to the two power meters 126. Then, the delay time "τ (second)" may be sent to controller 128 to facilitate calculating OSNR.

Controller 128 may use a stored symbol rate "F (bps)" to facilitate calculation of the rate "t" using the delay time "τ (second)," for example, by Equation (10).

$$t = \frac{\tau}{1/F} = \tau \times F \qquad (10)$$

The power monitors 126 may determine "P1" and "P2" as described above, and may supply these values to controller 128. Controller 128 may utilize the bandwidth "B (nm)", the delay time amount "τ (second)", the optical powers "P1 (mW) and P2 (mW)", and the rate "t" of the delay time for one bit time received as described above to Expression (9) to thereby measure the OSNR. Thereafter, controller 128 may store the calculated OSNR or may output the measured OSNR to a management device or the like.

FIGS. 3-11B illustrate various alternative embodiments of a device for measuring OSNR, in accordance with the present disclosure. As abbreviated on some of the figures, BPF may refer to a band-pass filter, D may refer to delay, and PS may refer to a sub-component of a delay interferometer that may cause phase shifting to occur.

Figure 3:
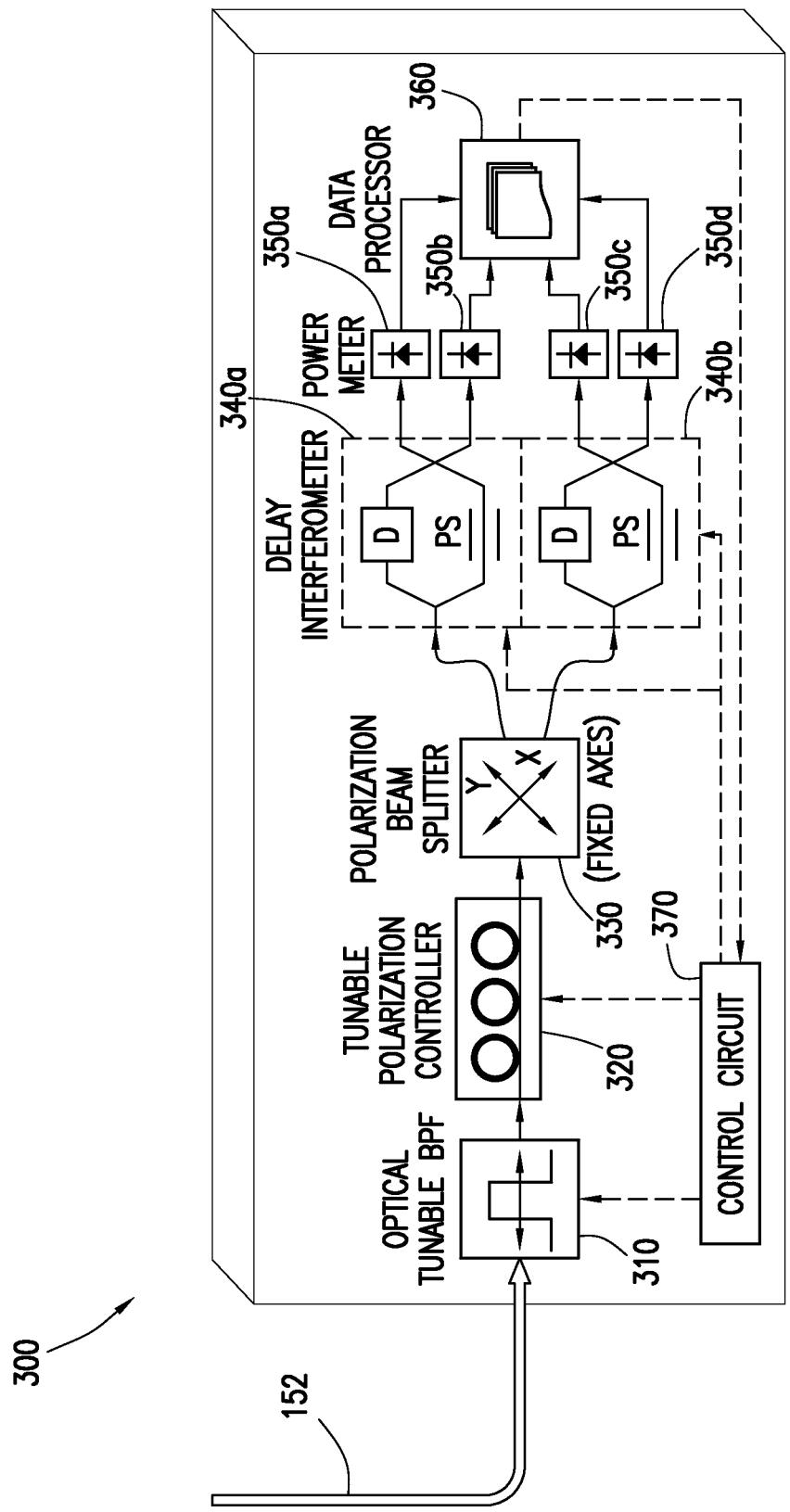
FIGS. 3-11B illustrate various alternative embodiments of a device for measuring OSNR, in accordance with the present disclosure.

FIG. 3 illustrates an OSNR monitor device 300. OSNR monitor device 300 may comprise an optical tunable band-pass filter 310 as the wavelength treatment device. OSNR monitor device 300 may also comprise a tunable polarization controller 320 and polarization beam splitter 330 as the polarization treatment component. OSNR monitor device 300 may also comprise delay interferometers 340a and 340b as interferometer 125. OSNR monitor device 300 may additionally comprise power meters 350a-350d. OSNR monitor device 300 may also comprise data processor 360 and control circuit 370 as the controller.

Optical tunable band-pass filter (BPF) 310 may be any device, system, or circuitry configured to separate a particular wavelength from a plurality of wavelengths. For example, optical tunable BPF 310 may be configured to allow only a particular range of wavelength of an optical signal to pass through optical tunable BPF 310. This range may be a 0.1 nm band of the optical signal. In some embodiments, optical tunable BPF 310 may be communicatively coupled with control circuit 370, and may receive instructions from control circuit 370 with respect to a desired range of wavelength to allow to pass through optical tunable BPF 310. Optical tunable BPF 310 may receive an incoming optical signal, for example, minor component 152. Optical tunable BPF 310 may then separate out a particular wavelength from minor component 152, and may then pass that filtered optical signal on to tunable polarization controller 320.

Tunable polarization controller 320 may be configured to adjust the x-polarization and y-polarization components of a received optical signal. Such adjustments may include polarization shifting of the x-polarization and y-polarization components. Furthermore, tunable polarization controller 320 may be configured to adjust such components to align with the orientation of polarization beam splitter 330. Tunable polarization controller 320 may be implemented in any suitable manner to perform such adjustments, for example, by any device, system, or circuitry. Tunable polarization controller 320 may be communicatively coupled to control circuit 370. Control circuit 370 may be configured to adjust the operation of tunable polarization controller 320. Such adjustments may be based upon, for example, the nature or kind of input signal, detected output of tunable polarization controller 320, or orientation of polarization beam splitter 330.

Polarization beam splitter 330 may be configured to split an input signal according to two fixed axes. For example, minor component 152 may include an x-polarization component and a y-polarization component, and if these components are aligned with the fixed axes of polarization beam splitter 330, they may be separated. Thus, polarization beam splitter 330 may be configured to output the x-polarization component of minor component 152 and to output the y-polarization component of minor component 152. Polarization beam splitter 330 may be configured to output each polarization along an independent path or channel. For example, the x-polarization component may be provided to delay interferometer 340a and the y-polarization component may be provided to delay interferometer 340b. Polarization beam splitter 330 may be implemented in any suitable manner for splitting its input signal into x-polarization and y-polarization components. Polarization beam splitter 330 may be configured such that the outputs have fixed axes with respect to x-polarization and y-polarization. Thus, tunable polarization controller 320 may align the polarization of the received optical signal such that the fixed axes of polarization beam splitter 330 may appropriately separate out the x-polarization and y-polarization components.

Delay interferometer 340 may be implemented as any system or device configured to cause differences in two paths of a separated optical signal such that OSNR may be determined. For example, delay interferometers 340a and 340b may cause one or both paths to be one of delayed or phase shifted. Delay interferometers 340a and 340b may operate as described above with respect to calculating or determining OSNR. Delay interferometers 340a and 340b may be communicatively coupled with control circuit 370. Control circuit 370 may provide instructions or direction to delay interferometers 340a and 340b. For example, control circuit 370 may instruct delay interferometers 340a and 340b regarding duration of delay time "τ" or a desired amount of phase shifting. Delay interferometers 340a and 340b may provide their outputs to power meters 350a-350d as described above.

In some embodiments, power meters 350b and 350d may be omitted. In such an embodiment, power meter 350a may first measure P1 (for example, the constructive interference) of a certain wavelength and polarization component of an optical signal. The phase-shifting component of delay interferometer 340a may then be detuned, and then returned to include the phase-shift plus π such that P2 (for example, the destructive interference) may be measured. By measuring them separately, only one power meter 350a may be required for interferometer 340a. In like manner, interferometer 340b, which may be handling an alternative polarization component of the optical signal, may only require one power meter 350c.

Data processor 360 may be configured to calculate or determine OSNR based on inputs received at least from power meters 350a and 350b for delay interferometer 340a, and determine OSNR based on inputs received at least from power meters 350c and 350d for delay interferometer 340b. In some embodiments, data processor 360 may also receive inputs from control circuit 370, optical tunable BPF 310, delay interferometer 340a and/or 340b, power meters 350a-

350b, or any combinations thereof. For example, data processor 360 may receive information regarding "B," "t," "P1," and "P2" for each of the pair of outputs for delay interferometers 340a and 340b. In this way, data processor 360 may calculate OSNR for both outputs of polarization beam splitter 330 simultaneously, or essentially simultaneously. Data processor 360 may be implemented as any system, device, circuitry, or component to allow data processor 360 to determine OSNR. For example, data processor 360 may be implemented as a processor, microprocessor, microcontroller, ASIC, or FPGA. Data processor 360 may also comprise associated computer-readable media. In some embodiments, data processor 360 may provide the calculated OSNRs to control circuit 370. In some embodiments, control circuit 370 and data processor 360 may be implemented as the same physical component.

Control circuit 370 may be configured to provide instructions to at least one of optical tunable BPF 310, tunable polarization controller 320, and delay interferometers 340a and 340b. Control circuit 370 may be implemented as a processor, microprocessor, microcontroller, ASIC, or FPGA. In some embodiments, control circuit 370 may also comprise associated computer readable media.

Using the embodiment shown in FIG. 3, OSNR may be determined separately and independently for the x-polarization and the y-polarization components of an optical signal. Additionally, they may be determined essentially simultaneously and essentially in real time.

Figure 4:
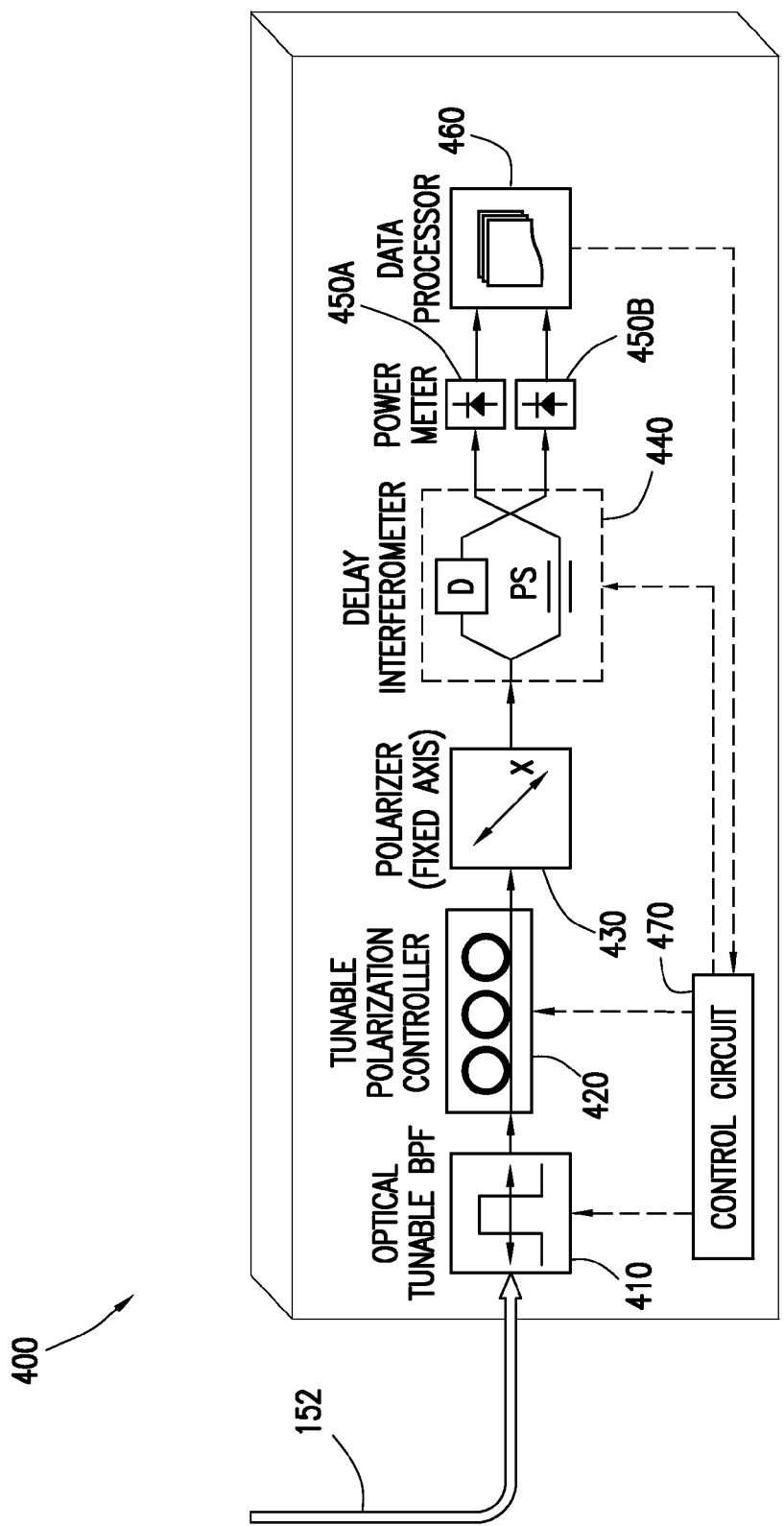

FIG. 4 illustrates an alternative embodiment of an OSNR monitor device 400. OSNR monitor device 400 may comprise an optical tunable BPF 410 as the wavelength treatment device. OSNR monitor device 400 may comprise a tunable polarization controller 420 and a polarizer 430 as the polarization treatment component. OSNR monitor device 400 may also comprise delay interferometer 440 as interferometer 125. OSNR monitor device 400 may comprise a data processor 460 and a control circuit 470 as the controller. OSNR monitor device 400 may also include power meters 450a and 450b.

OSNR monitor device 400 may receive an incoming signal, for example, minor component 152. Optical tunable BPF 410 may handle the incoming signal as described above with respect to optical tunable BPF 310. The signal may then be passed to tunable polarization controller 420. Tunable polarization controller 420 may operate in a similar fashion to tunable polarization 320 described above. However, tunable polarization controller 420 may initially tune its output such that the x-polarization component of the optical signal is first aligned with polarizer 430, and then be tuned such that they y-polarization component of the optical signal is aligned with polarizer 430.

Polarizer 430 may be configured to filter out any polarized signal besides a particular axis of polarization. For example, minor component 152 may include an x-polarization component and a y-polarization component. When minor component 152 is oriented one way, polarizer 430 may output the x-polarization component of minor component 152. When minor component 152 is oriented another way (for example, rotated ninety degrees), polarizer 430 may output the y-polarization component of minor component 152. Polarizer 430 may be configured to output the filtered optical signal to delay interferometer 440. Polarizer 430 may be implemented in any suitable manner for filtering out any polarized light besides the particular axis of polarizer 430. In this way, polarizer 430 may be referred to as having a fixed axis. In some embodiments, tunable polarization controller 420 may orient the optical signal such that the x-polarization component may be selected at polarizer 430. Tunable polarization controller 420 may then be modified to orient the optical signal such that the y-polarization component may be selected at polarizer 430.

Delay interferometer 440 may be implemented as described above with respect to delay interferometer 340a and 340b. Power meters 450a and 450b may be implemented as described above with respect to power meters 350a-350d.

Data processor 460 may be implemented as described above with respect to data processor 360. Control circuit 470 may be implemented as described above with respect to control circuit 370. However, control circuit 470 may be configured to cause tunable polarization controller 420 to re-orient the optical signal after OSNR for one polarization component has been determined such that OSNR may be determined for another polarization component. For example, control circuit 470 may direct tunable polarization controller 420 to orient the optical signal such that polarizer 430 will separate out the x-polarization component so its OSNR may be determined. Once control circuit 470 receives the OSNR for the x-polarization component from data processor 460, control circuit 470 may direct tunable polarization controller 420 to re-orient the optical signal such that the y-polarization component of the optical signal may be selected at polarizer 430.

As described above, in some embodiments, the number of power meters may be reduced be half by first measuring P1 (for example, the constructive interference) of a certain wavelength and polarization component of an optical signal and then retuning a phase-shifting component such that the signal is phase-shift plus it and then measuring P2 (for example, the destructive interference).

Using the embodiment shown in FIG. 4, OSNR may be determined separately and independently for the x-polarization and the y-polarization components of an optical signal. The OSNR for these polarizations may be determined successively, for example, by first determining OSNR for the x-polarization component, and then re-orienting the tunable polarization controller 420 to select and determine OSNR for the y-polarization component.

Figure 5:
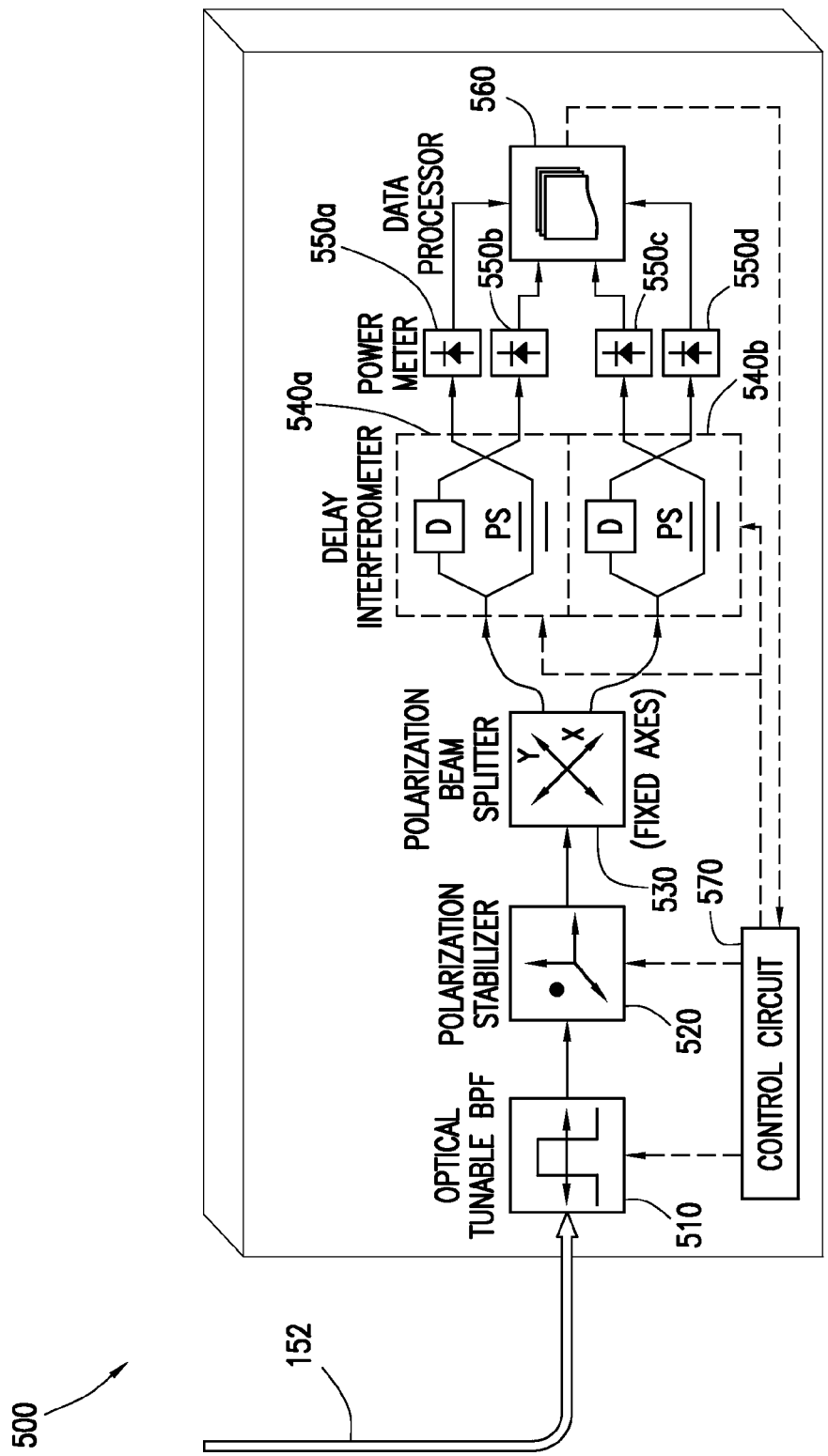

FIG. 5 illustrates an alternative embodiment of an OSNR monitor device 500. OSNR monitor device 500 may comprise an optical tunable BPF 510 as the wavelength treatment device. OSNR monitor device 500 may comprise a polarization stabilizer 520 and a polarization beam splitter 530 as the polarization treatment component. OSNR monitor device 500 may also comprise delay interferometers 540a and 540b as interferometer 125. OSNR monitor device 500 may comprise a data processor 560 and a control circuit 570 as the controller. OSNR monitor device 500 may also include power meters 550a-550d.

OSNR monitor device 500 may receive an incoming signal, for example, minor component 152. Optical tunable BPF 510 may handle the incoming signal as described above with respect to optical tunable BPF 310. The signal may then be passed to polarization stabilizer 520.

Polarization stabilizer 520 may be configured to stabilize the orientation of polarization of an optical signal to a particular set of fixed axes. Such stabilization may include a polarization shifting of the x-polarization and y-polarization components. Furthermore, polarization stabilizer 520 may be oriented such that the output of polarization stabilizer is aligned with the fixed axes of polarization beam splitter 530 such that the x-polarization and y-polarization components of the optical signal may be appropriately separated at polarization beam splitter 530. Polarization stabilizer 520 may be implemented in any suitable manner to perform such adjustments, for example, by any device, system, or analog or digital circuitry. Polarization stabilizer 520 may also include logic or other processing capability to facilitate the stabilization of the polarization of the optical signal. Polarization stabilizer 520 may be communicatively coupled to control circuit 570. Control circuit 570 may be configured to inform polarization stabilizer 520 as to a desired orientation of polarization stabilizer 520's fixed axes. The desired orientation may be based upon, for example, the nature or kind of input signal, the detected output of polarization stabilizer 520, or orientation of polarization beam splitter 530.

Once stabilized to fixed axes, the optical signal may be passed from polarization stabilizer 520 to polarization beam splitter 530. Polarization beam splitter may operate and be implemented similar to polarization beam splitter 330 as described above. In like manner, delay interferometers 540a and 540b may function similarly to delay interferometers 340a and 340b as described above; power meters 550a-550d may function similarly to power meters 350a-350d as described above; and data processor 560 and control circuit 570 may function similarly to data processor 360 and control circuit 370.

As described above, in some embodiments, the number of power meters may be reduced by half by first measuring P1 (for example, the constructive interference) of a certain wavelength and polarization component of an optical signal and then retuning a phase-shifting component such that the signal is phase-shift plus $\pi$ and then measuring P2 (for example, the destructive interference).

Using the embodiment shown in FIG. 5, OSNR may be determined separately and independently for the x-polarization and the y-polarization components of an optical signal. Additionally, they may be determined essentially simultaneously and essentially in real time.

Figure 6:
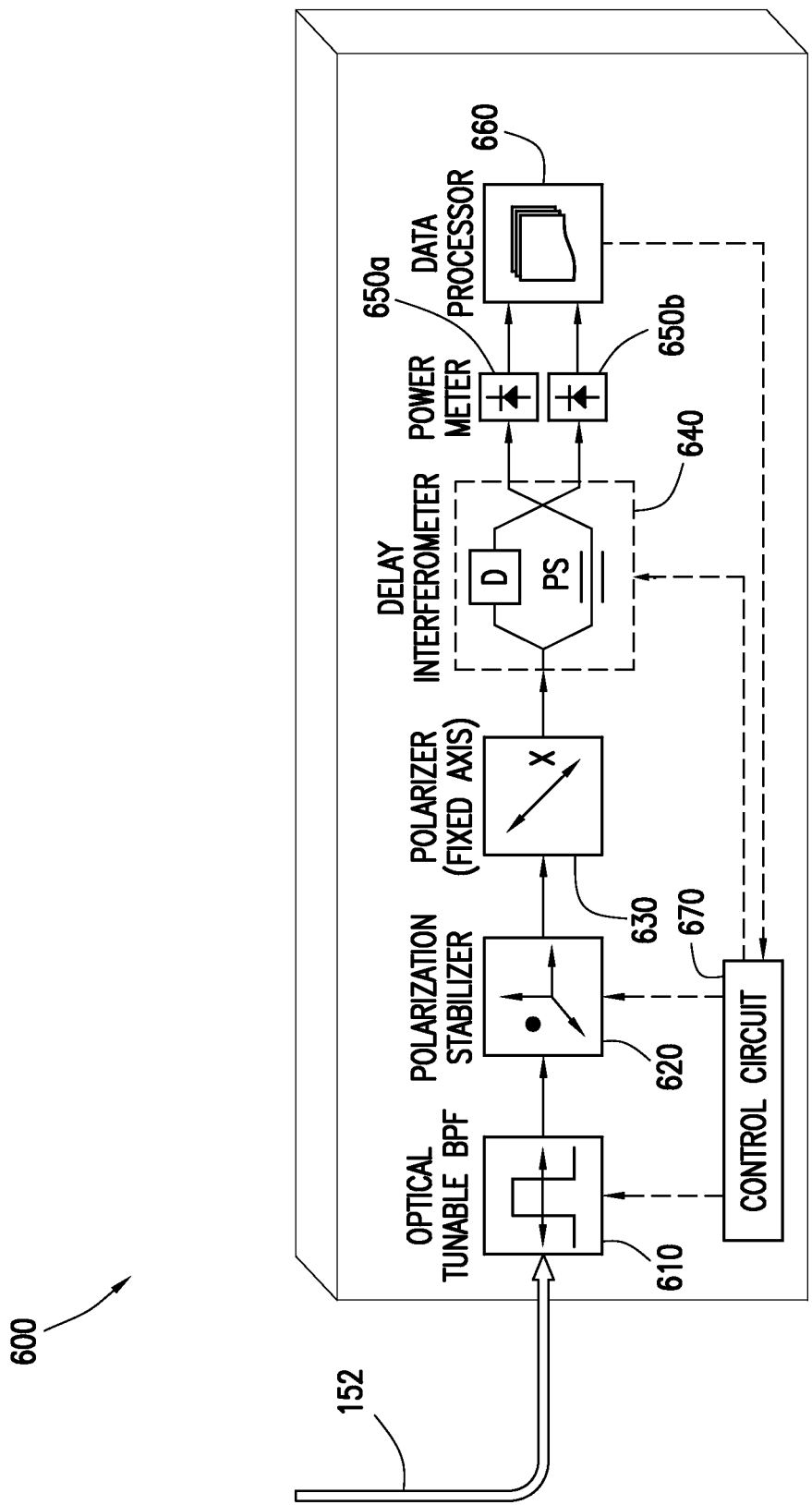

FIG. 6 illustrates an alternative embodiment of an OSNR monitor device 600. OSNR monitor device 600 may comprise an optical tunable BPF 610 as the wavelength treatment device. OSNR monitor device 600 may comprise a polarization stabilizer 620 and a polarizer 630 as the polarization treatment component. OSNR monitor device 600 may also comprise delay interferometer 640 as interferometer 125. OSNR monitor device 600 may comprise a data processor 660 and a control circuit 670 as the controller. OSNR monitor device 600 may also include power meters 650a and 650b.

OSNR monitor device 600 may receive an optical signal, for example, minor component 152. The optical signal may first have a particular wavelength selected by optical tunable BPF 610. Optical tunable BPF 610 may operate and be implemented in a similar fashion to optical tunable BPF 310 as described above. Optical tunable BPF 610 may then pass the optical signal to polarization stabilizer 620 to orient and stabilize the optical signal according to its fixed axes. Polarization stabilizer 620 may function and be implemented in a similar fashion to polarization stabilizer 520 described above. The axes of polarization stabilizer 620 may be aligned with polarizer 630 such that when the optical signal is sent through the fixed axis of polarizer 630, one polarization component of a plurality of polarization components of the optical signal may be passed on to delay interferometer 640, for example, only one of the x-polarization or the y-polarization components. Delay interferometer 640 and power meters 650a and 650b may function and be implemented in a similar fashion to delay interferometer 340 and power meters 350a-350d, as described above. Power meters 650a and 650b may pass along their readings to data processor 660 to facilitate calculation of OSNR for the selected wavelength and polarization component. Data processor 660 and control circuit 670 may function and be implemented in a similar fashion to data processor 360 and control circuit 370 as described above.

Control circuit 670 may provide instructions and or directions to polarization stabilizer 620. For example, as shown in FIG. 6, after a first polarization component has had the OSNR determined, control circuit 670 may direct polarization stabilizer 620 to re-orient which polarization component is along its fixed axes. For example, if polarizer 630 was oriented to handle x-polarization component received from polarization stabilizer 620, after OSNR for the x-polarization component was determined, control circuit 670 may direct polarization stabilizer 620 to re-orient the optical signal such that the y-polarization component may be oriented to the axis previously occupied by the x-polarization component such that polarizer 630 may then filter for the y-polarization component. In this way, polarization stabilizer 620 may operate in a similar fashion to tunable polarization controller 420. However, where a tunable polarization controller may be configured to rotate an optical signal through any degree of rotation, causing the polarization to be oriented in any direction, a polarization stabilizer may be configured to orient the optical signal to a fixed set of axes, although how the optical signal is oriented to conform to those axes may be altered (for example, the x-polarization component may be along the x-axis, the y-axis, or the z-axis).

Control circuit 670 may facilitate successive determination of OSNR for a plurality of polarization components of an optical signal. For example, control circuit 670 may direct polarization stabilizer 620 to orient the optical signal such that polarizer 630 will separate out the x-polarization component so its OSNR may be determined. Once control circuit 670 receives the OSNR for the x-polarization component from data processor 660, control circuit 670 may direct polarization stabilizer 620 to re-orient the optical signal such that the y-polarization component of the optical signal may be selected at polarizer 630 so that it may also have its OSNR determined.

As described above, in some embodiments, the number of power meters may be reduced by half by first measuring P1 (for example, the constructive interference) of a certain wavelength and polarization component of an optical signal and then retuning a phase-shifting component such that the signal is phase-shift plus it and then measuring P2 (for example, the destructive interference).

Using the embodiment shown in FIG. 6, OSNR may be determined separately and independently for the x-polarization and the y-polarization components of an optical signal. The OSNR for these polarizations may be determined successively, for example, by first determining the x-polarization, and then re-orienting polarization stabilizer 620 to select and determine OSNR for the y-polarization.

Figure 7:
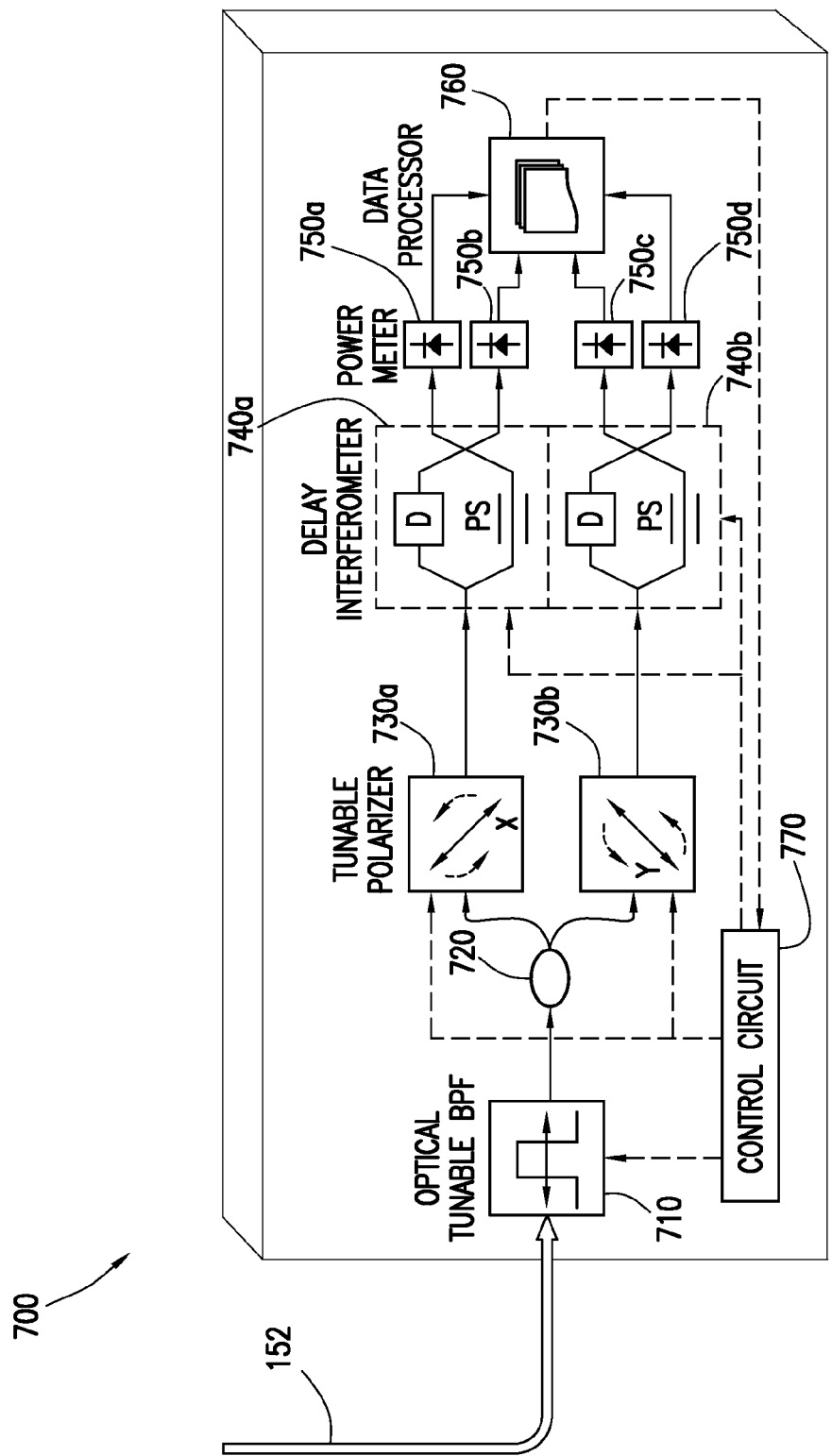

FIG. 7 illustrates an alternative embodiment of an OSNR monitor device 700. OSNR monitor device 700 may comprise an optical tunable BPF 710 as the wavelength treatment device. OSNR monitor device 700 may comprise tunable polarizers 730a and 730b as the polarization treatment component. OSNR monitor device 700 may also comprise delay interferometers 740a and 740b as interferometer 125. OSNR monitor device 700 may comprise a data processor 760 and a control circuit 770 as the controller. OSNR monitor device 700 may also include power meters 750a-750d. OSNR monitor device 700 may additionally comprise a signal splitter 720.

OSNR monitor device 700 may receive an optical signal, for example, minor component 152. The optical signal may first have a particular wavelength selected by optical tunable BPF 710. Optical tunable BPF 710 may operate and be implemented in a similar fashion to optical tunable BPF 310 as described above. Optical tunable BPF 710 may then pass the optical signal to signal splitter 720. Signal splitter 720 may be any system, device, circuitry, or combination thereof configured to divide an incoming signal into multiple paths. Signal splitter 720 may have an associated loss with splitting the signal, for example, three decibels (dB). Signal splitter 720 may be configured such that each of the split signals may have the same information and/or format as the unsplit signal, but at reduced amplitude. For example, if the signal were a sine wave, the same function of sine wave may still be observed in the split signals, and only the amplitude may be reduced.

As shown in FIG. 7, each of the paths from signal splitter 720 may carry the optical signals to tunable polarizers 730a and 730b. Tunable polarizers 730a and 730b may be configured to operate in a similar manner to polarizer 430. However, rather than having a fixed axis that is filtered for, tunable polarizers 730a and 730b may be modified and adjusted to vary the orientation of the axis that is selected. For example, if an optical signal had the x-polarization component of the signal shifted fifteen degrees, tunable polarizer 730a may be tuned by fifteen degrees such that the x-polarization component may be selected through tunable polarizer 730a. To further the example, tunable polarizer 730b may be tuned to select for the y-polarization component of the optical signal. Tunable polarizers 730a and 730b may be implemented in any suitable manner to perform such adjustments, for example, by any device, system, or analog or digital circuitry. Tunable polarizers 730a and 730b may be communicatively coupled to control circuit 770. Control circuit 770 may be configured to adjust the operation of tunable polarizers 730a and 730b. Such adjustments may be based upon, for example, the nature or kind of input signal or detected output of tunable polarizers 730a or 730b. In some embodiments, control circuit 770 may only determine the degree of tuning needed for one of the x-polarization or y-polarization components, and then may determine the other by shifting it by ninety degrees. Using the example above, if control circuit 770 determined that the x-polarization were shifted by fifteen degrees, control circuit 770 may instruct tunable polarizer 730a to be tuned by fifteen degrees and may instruct tunable polarizer 730b to be tuned by fifteen degrees plus ninety degrees, or one-hundred and five degrees.

The signals output from tunable polarizers 730a and 730b may be passed on to delay interferometers 740a and 740b. Delay interferometers 740a and 740b and power meters 750a-750d may function and be implemented in a similar fashion to delay interferometers 340a and 340b and power meters 350a-350d, as described above. Power meters 750a-750d may pass along their readings to data processor 760 to facilitate calculation of OSNR for the selected wavelength and polarization component. Data processor 760 and control circuit 770 may function and be implemented in a similar fashion to data processor 360 and control circuit 370 as described above.

As described above, in some embodiments, the number of power meters may be reduced by half by first measuring P1 (for example, the constructive interference) of a certain wavelength and polarization component of an optical signal and then retuning a phase-shifting component such that the signal is phase-shift plus it and then measuring P2 (for example, the destructive interference).

Using the embodiment shown in FIG. 7, OSNR may be determined separately and independently for the x-polarization and the y-polarization components of an optical signal. Additionally, they may be determined essentially simultaneously and essentially in real time.

Figure 8:
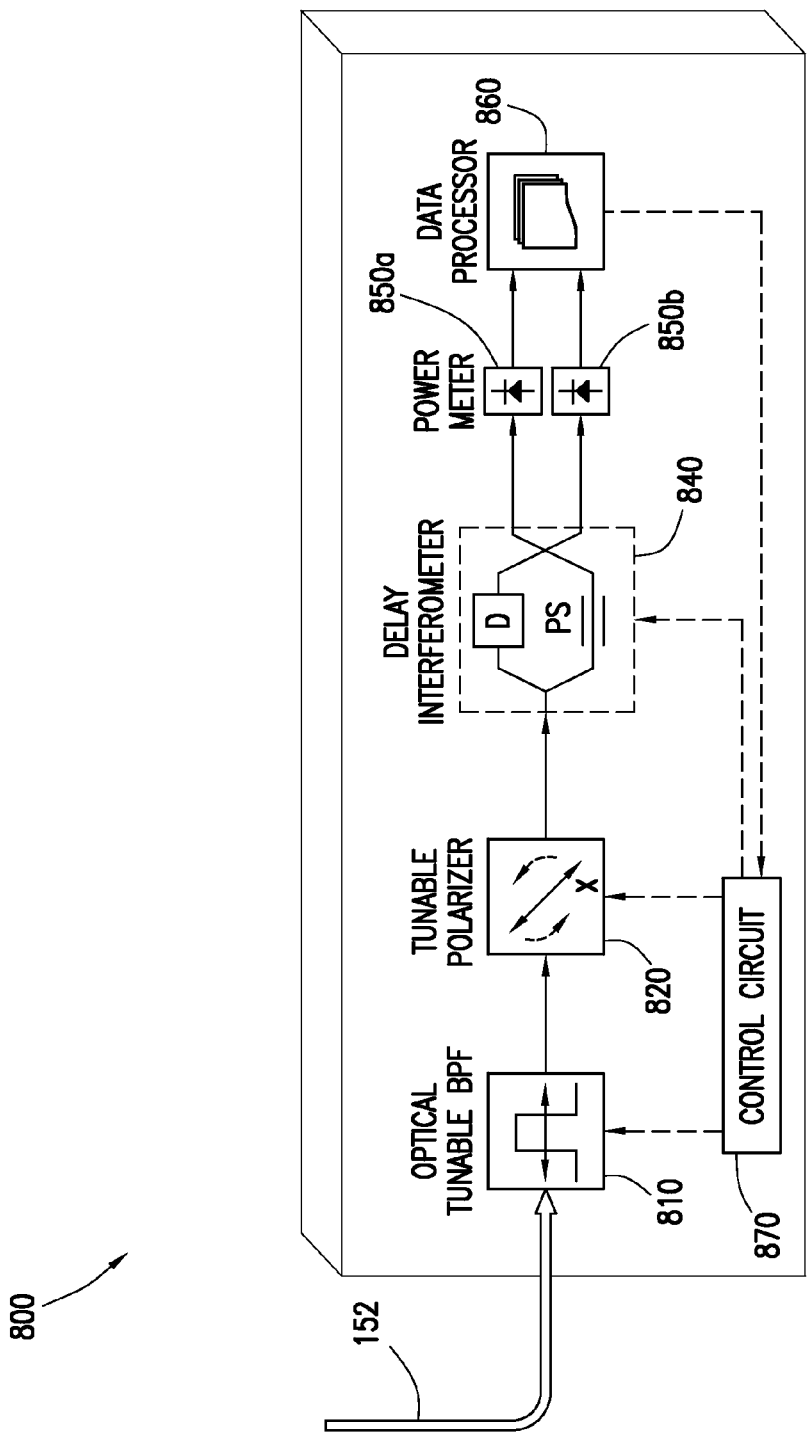

FIG. 8 illustrates an alternative embodiment of an OSNR monitor device 800. OSNR monitor device 800 may comprise an optical tunable BPF 810. OSNR monitor device 800 may comprise tunable polarizer 820 as the polarization treatment component. OSNR monitor device 800 may also comprise delay interferometer 840 as interferometer 125. OSNR monitor device 800 may comprise a data processor 860 and a control circuit 870 as the controller. OSNR monitor device 800 may also include power meters 850a and 850b.

OSNR monitor device 800 may receive an optical signal, for example, minor component 152. The optical signal may first have a particular wavelength selected by optical tunable BPF 810. Optical tunable BPF 810 may operate and be implemented in a similar fashion to optical tunable BPF 310 as described above. Optical tunable BPF 810 may then pass the optical signal to tunable polarizer 820. Tunable polarizer 820 may operate and be implemented in a similar fashion to tunable polarizers 730a and 730b. However, once OSNR has been determined for a first polarization component of the optical signal, control circuit 870 may direct tunable polarizer to re-orient the axis that it is selecting to select a second polarization component of the optical signal, to facilitate determination of the OSNR for the second polarization component. For example, tunable polarizer 820 may be initially oriented to select out the x-polarization component of an optical signal. Once control circuit 870 recognizes that OSNR for the x-polarization component has been determined, control circuit 870 may direct tunable polarizer 820 to tune itself such that tunable polarizer selects out the y-polarization component of the optical signal, rather than the x-polarization component. This may facilitate the successive independent determination of OSNR for a plurality of polarizations of an optical signal.

The signal output from tunable polarizer 820 may be passed on to delay interferometer 840. Delay interferometer 840 and power meters 850a and 850b may function and be implemented in a similar fashion to delay interferometers 340a and 340b and power meters 350a-350d, as described above. Power meters 850a and 850b may pass along their readings to data processor 860 to facilitate calculation of OSNR for the selected wavelength and polarization component. Data processor 860 and control circuit 870 may function and be implemented in a similar fashion to data processor 360 and control circuit 370 as described above.

As described above, in some embodiments, the number of power meters may be reduced by half by first measuring P1 (for example, the constructive interference) of a certain wavelength and polarization component of an optical signal and then retuning a phase-shifting component such that the signal is phase-shift plus it and then measuring P2 (for example, the destructive interference).

Using the embodiment shown in FIG. 8, OSNR may be determined separately and independently for the x-polarization and the y-polarization components of an optical signal. The OSNR for these polarizations may be determined successively, for example, by first determining the x-polarization, and then re-orienting tunable polarizer 820 to select and determine OSNR for the y-polarization.

Figure 9A:
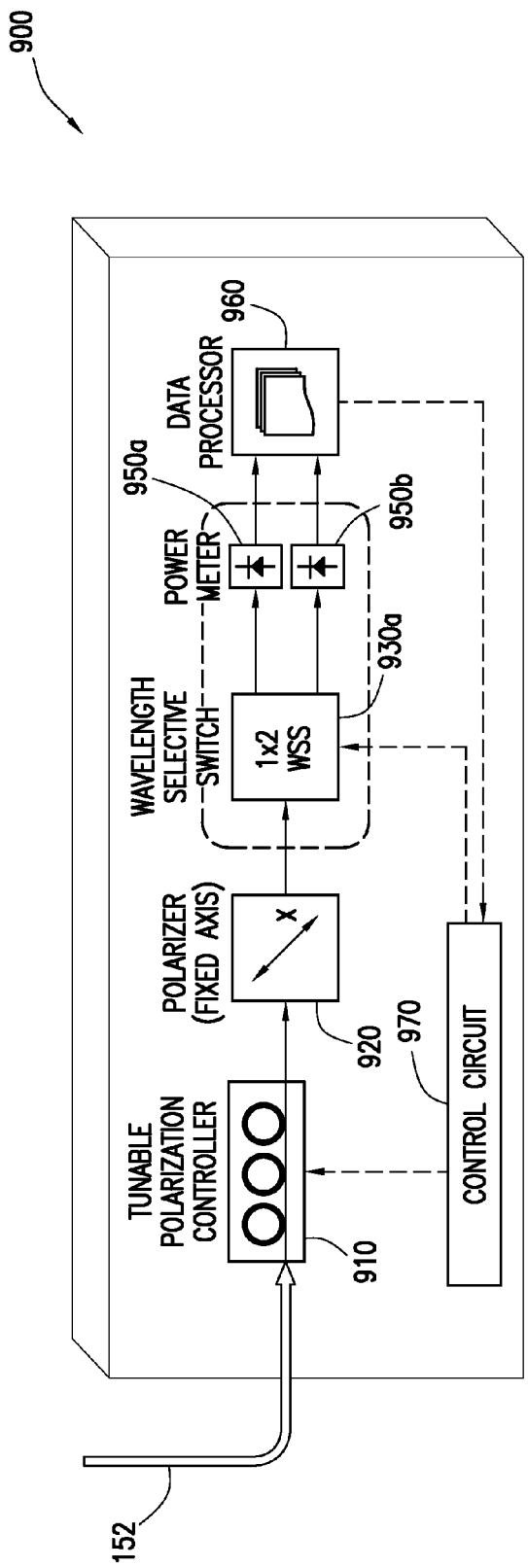
Figure 9B:
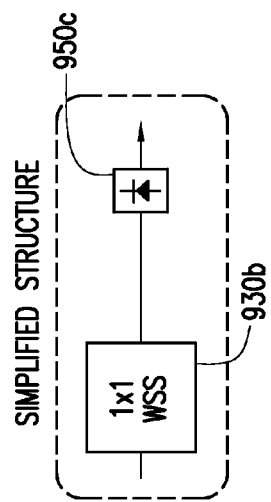

FIGS. 9A and 9B illustrate alternative embodiments of an OSNR monitor device 900. As shown in FIG. 9A, OSNR monitor device 900 may comprise a wavelength selective switch (WSS) 930a as the wavelength treatment device. OSNR monitor device 900 may comprise tunable polarization controller 910 and polarizer 920 as the polarization treatment component. OSNR monitor device 900 may comprise a data processor 960 and a control circuit 970 as the controller. OSNR monitor device 900 may also include power meters 950a and 950b.

OSNR monitor device 900 may receive an optical signal, for example, minor component 152. Tunable polarization controller 910 and polarizer 920 may function and be implemented in similar fashion to tunable polarization controller 420 and polarizer 430. For example, tunable polarization controller 910 may orient the optical signal to align one of the polarizations of the optical signal with the axis of polarizer 920. Once the OSNR for that polarization component has been determined, control circuit 970 may instruct tunable polarizer to tune the optical signal such that a second polarization component is aligned with the axis of polarizer 920 (for example, by first aligning the x-polarization and then the y-polarization). The output of polarizer 920 may be passed to WSS 930a.

WSS 930a may be configured to intelligently perform various wavelength treatments on the optical signal, including, for example, filtering, delaying, phase shifting, or any combinations thereof. WSS 930a may thus be configured to select a desired channel of the optical signal to have its OSNR determined, for example, on a per-wavelength basis. WSS 930a may be implemented in any suitable manner, such as by a device, system, circuitry, or combinations thereof to facilitate performance of these functions. For example, WSS 930a may include fibers, active or passive configurable filters, array waveguides, electromechanical devices, crystals, or any combinations thereof. WSS 930a may be communicatively coupled to control circuit 970. Control circuit 970 may be configured to adjust the operation of WSS 930a to, for example, filter, delay, or phase shift the input signal. Such adjustments may be based upon, for example, the nature or kind of input optical signal, detected output of WSS 930a, or detected output of polarizer 920. In some embodiments, WSS 930 may be implemented as having one input and two outputs (e.g. a 1×2 WSS like WSS 930a) or may be implemented as having one input and one output (e.g. a 1×WSS like WSS 930b shown in FIG. 9B).

WSS 930a may comprise a processor, microprocessor, microcontroller, FPGA, ASIC or some other logic device to facilitate WSS 930a performing any of the filtering, delaying, or phase shifting of the optical signal. For example, WSS 930a may include modules, circuitry, or software configured to delay, adjust phase, filter or adjust power levels of components of signals. For example, the phases of the input signal may be adjusted to facilitate determination of OSNR. In addition, WSS 930a may include software configured to control the operation of WSS 930a. The software may include instructions resident upon a computer-readable medium for execution by a processor.

WSS 930a may be configured to operate in a similar manner and upon similar principles to delay interferometers 340a and 340b. For example, WSS 930a may cause the outputs to be delayed and/or phase shifted such that a comparison of the two outputs of WSS 930a may be used to determine OSNR. In some embodiments, an optical signal may be split into two parts for each output (thus, for a 1×2 WSS, an optical signal may be split into four parts) and each part may be individually handled. For example, a first part may remain unchanged and a second part may be delayed and phase-shafted, the first two parts caused to interfere with each other as the constructive interference and be output on one of the outputs. A third part may remain unchanged and a fourth part may be delayed and phase-shifted as before but also plus π radians. The third and fourth parts may be caused to interfere with each other as destructive interference and be output as the other of the outputs. The outputs of WSS 930a may be passed to power meters 950a and 950b. Power meters 950a and 950b may function and may be implemented in similar fashion to power meters 350a-350d. Power meters 950a and 950b may pass along their readings to data processor 960 to facilitate calculation of OSNR for the selected wavelength and polarization component. Data processor 960 and control circuit 970 may function and be implemented in a similar fashion to data processor 360 and control circuit 370 as described above.

With reference to FIG. 9B, rather than using a 1×2 WSS (e.g. WSS 930a), in some embodiments a 1×1 WSS (e.g. WSS 930b) may be used. For example, the dashed portion of FIG. 9A may be swapped for the dashed portion of FIG. 9B. In such an embodiment, OSNR monitor device 900 may include power meter 950c to receive the one output of WSS 930b. While a delay interferometer may output two signals and have their powers compared, WSS 930b may output one of those signals first, and have that power stored, for example at one of data processor 960 or control circuit 970, and then WSS 930b may output the other signal such that the OSNR may be determined using both output signals. For example, rather than simultaneously determining "P1" and "P2" as described above, "P1" and "P2" may be determined successively using WSS 930b and power meter 950c.

Using the embodiments shown in FIGS. 9A and 9B, OSNR may be determined separately and independently for the x-polarization and the y-polarization components of an optical signal. The OSNR for these polarizations may be determined successively, for example, by first determining the x-polarization, and then re-orienting tunable polarization controller 910 so that OSNR for the y-polarization component may be determined. Using the embodiment shown in FIG. 9B, each of the two signals used to determine OSNR for one of the polarization components may be measured successively, rather than simultaneously.

Figure 10A:
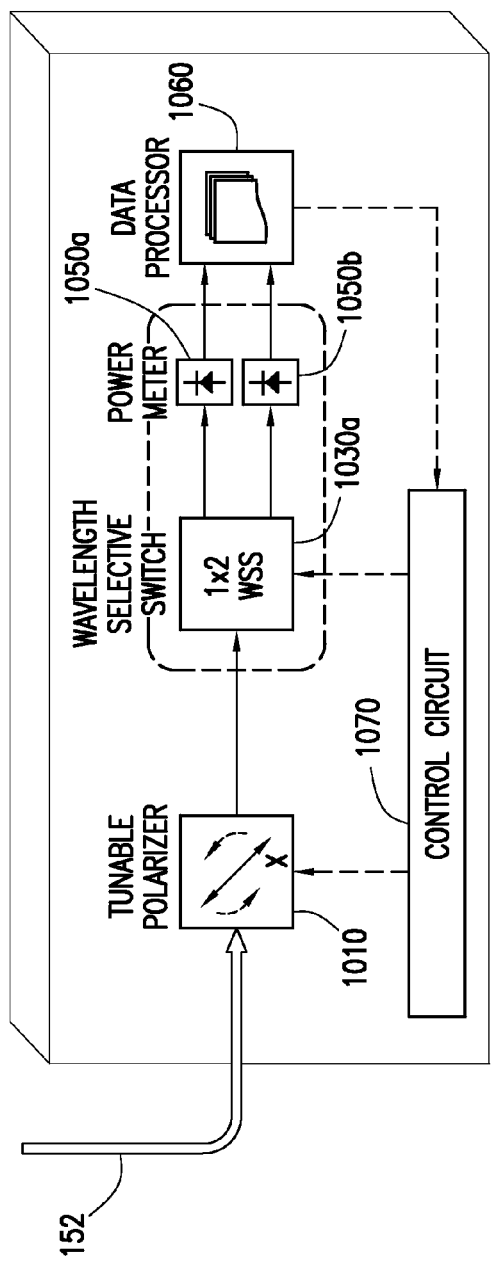
Figure 10B:
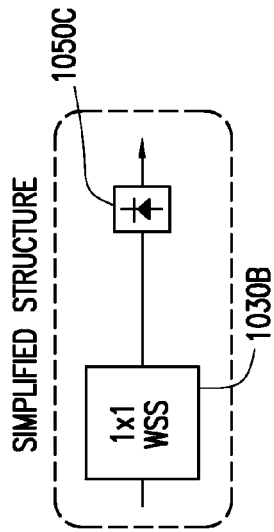

FIGS. 10A and 10B illustrate alternative embodiments of an OSNR monitor device 1000. As shown in FIG. 10A, OSNR monitor device 1000 may comprise a wavelength selective switch (WSS) 1030a as the wavelength treatment device. OSNR monitor device 1000 may comprise tunable polarizer 1010 as the polarization treatment component. OSNR monitor device 1000 may comprise a data processor 1060 and a control circuit 1070 as the controller. OSNR monitor device 1000 may also include power meters 1050a and 1050b.

OSNR monitor device 1000 may receive an optical signal, for example, minor component 152. Tunable polarizer 1010 may function and be implemented in similar fashion to tunable polarizer 820. For example, tunable polarizer 1010 may orient its fixed axis to align with one of the polarizations of the optical signal. Once the OSNR for that polarization component has been determined, control circuit 1070 may instruct tunable polarizer 1010 to tune tunable polarizer 1010 such that a second polarization component is aligned with the axis of tunable polarizer 1010 (for example, by first aligning the x-polarization and then the y-polarization). The output of tunable polarizer 1010 may be passed to WSS 1030a. WSS 1030a may function and be implemented in a similar fashion to WSS 930a.

The outputs of WSS 1030a may be passed to power meters 1050a and 1050b. Power meters 1050a and 1050b may function and may be implemented in similar fashion to power meters 350a-350d. Power meters 1050a and 1050b may pass along their readings to data processor 1060 to facilitate calculation of OSNR for the selected wavelength and polarization component. Data processor 1060 and control circuit 1070 may function and be implemented in a similar fashion to data processor 360 and control circuit 370 as described above.

With reference to FIG. 10B, rather than using a 1×2 WSS (e.g. WSS 1030a), in some embodiments a 1×1 WSS (e.g.

WSS 1030b) may be used. For example, the dashed portion of FIG. 10A may be swapped for the dashed portion of FIG. 10B. In such an embodiment, OSNR monitor device 1000 may include power meter 1050c to receive the one output of WSS 1030b. WSS 1030b may function and be implemented in a similar manner to WSS 930b.

Using the embodiments shown in FIGS. 10A and 10B, OSNR may be determined separately and independently for the x-polarization and the y-polarization components of an optical signal. The OSNR for these polarizations may be determined successively, for example, by first determining the x-polarization, and then re-orienting tunable polarizer 1010 so that OSNR for the y-polarization component may be determined. Using the embodiment shown in FIG. 10B, each of the two signals used to determine OSNR for one of the polarization components may be measured successively, rather than simultaneously.

Figure 11A:
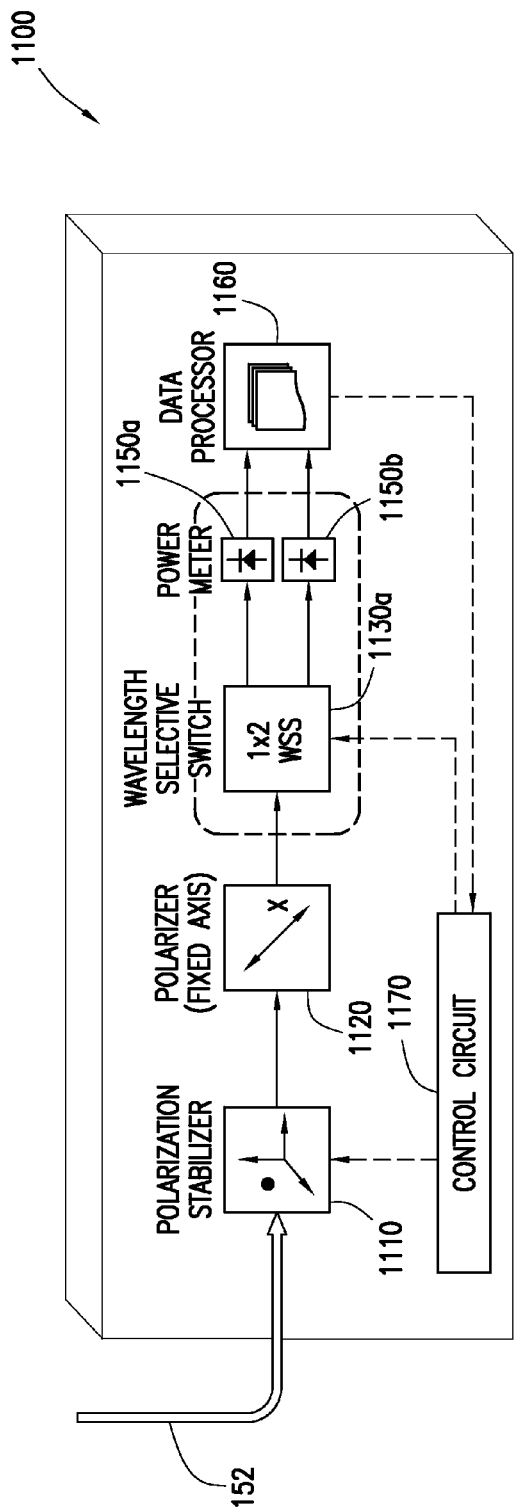
Figure 11B:
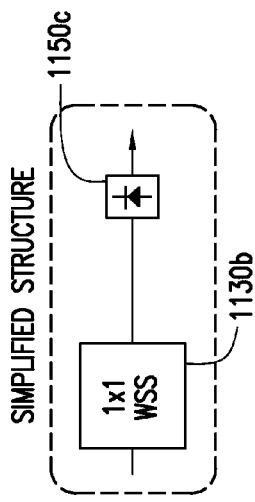

FIGS. 11A and 11B illustrate alternative embodiments of an OSNR monitor device 1100. As shown in FIG. 11A, OSNR monitor device 1100 may comprise a WSS 1130a as the wavelength treatment device. OSNR monitor device 1100 may comprise polarization stabilizer 1110 and polarizer 1120 as the polarization treatment component. OSNR monitor device 1100 may comprise a data processor 1160 and a control circuit 1170 as the controller. OSNR monitor device 1100 may also include power meters 1150a and 1150b.

OSNR monitor device 1100 may receive an optical signal, for example, minor component 152. Polarization stabilizer 1110 and polarizer 1120 may function and be implemented in similar fashion to polarization stabilizer 620 and polarizer 630. For example, polarization stabilizer 1110 may stabilize the polarization component of the received optical signal to align with the fixed axis of polarizer 1120. Once the OSNR for that polarization component has been determined, control circuit 1170 may instruct polarization stabilizer 1110 to re-orient which polarization component is along which of its fixed axes such that a second polarization component is aligned with the axis of polarizer 1120. For example, polarization stabilizer 1110 may first stabilize the x-polarization along an axis of polarization stabilizer 1110 that is aligned with the fixed axis of polarizer 1120 and then may stabilize the y-polarization along the axis aligned with the fixed axis of polarizer 1120. The output of polarizer 1120 may be passed to WSS 1130a. WSS 1130a may function and be implemented in a similar fashion to WSS 930a.

The outputs of WSS 1130a may be passed to power meters 1150a and 1150b. Power meters 1150a and 1150b may function and may be implemented in similar fashion to power meters 350a-350d. Power meters 1150a and 1150b may pass along their readings to data processor 1160 to facilitate calculation of OSNR for the selected wavelength and polarization component. Data processor 1160 and control circuit 1170 may function and be implemented in a similar fashion to data processor 360 and control circuit 370 as described above.

With reference to FIG. 11B, rather than using a 1×2 WSS (e.g. WSS 1130a), in some embodiments a 1×1 WSS (e.g. WSS 1130b) may be used. For example, the dashed portion of FIG. 11A may be swapped for the dashed portion of FIG. 11B. In such an embodiment, OSNR monitor device 1100 may include power meter 1150c to receive the one output of WSS 1130b. WSS 1130b may function and be implemented in a similar manner to WSS 930b.

Using the embodiments shown in FIGS. 11A and 11B, OSNR may be determined separately and independently for the x-polarization and the y-polarization components of an optical signal. The OSNR for these polarizations may be determined successively, for example, by first determining the x-polarization, and then re-orienting the optical signal using polarization stabilizer 1110 so that OSNR for the y-polarization component may be determined. Using the embodiment shown in FIG. 11B, each of the two signals used to determine OSNR for one of the polarization components may be measured successively, rather than simultaneously.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of a processor, one or more portions of a memory, or a combination of these, where appropriate. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A device for measuring optical signal-to-noise ratio (OSNR) of an optical signal comprising a plurality of polarization components and a plurality of wavelengths, the device comprising:
    a wavelength treatment device configured to select one wavelength from the plurality of wavelengths in the optical signal;
    a polarization treatment device configured to:
        receive the one wavelength of the optical signal from the wavelength treatment device; and
        separate a first and second polarization component from the plurality of polarization components in the one wavelength of the optical signal;
    a first interferometer configured to:
        delay a first portion of the first polarization component of the one wavelength of the optical signal;
        shift a phase of the first portion by a first amount and the first amount plus pi radians;
        cause the first portion to interfere with a second portion of the one polarization component of the one wavelength of the optical signal; and
        output interference of the first portion and second portion;
    a power meter configured to:
        receive the output of the first interferometer; and
        measure a power of the output of the first interferometer;
    a controller configured to:
        receive the measured power of the output of the first interferometer; and
        determine OSNR of the one wavelength of the first polarization component of the optical signal by comparing the power of the output of the first interferometer when the first interferometer shifts the phase by the first amount with the output of the first interferometer when the first interferometer shifts the phase by the first amount plus pi radians; and
    a second interferometer configured to receive the second polarization component and determine the OSNR of the one wavelength of the second polarization component of the optical signal, the first interferometer and the second interferometer determining the OSNRs in parallel;
    wherein the first polarization component and the second polarization component each carry distinct information.

2. The device of claim 1, wherein the wavelength treatment device comprises a tunable band pass filter.

3. The device of claim 1, the OSNR monitor device further comprising at least two power meters;
    wherein the polarization treatment device comprises:
        a tunable polarization controller; and
        a polarization beam splitter;
    wherein the wavelength treatment device is configured to select the one wavelength of the optical signal and pass the one wavelength to the polarization treatment device;
    wherein the polarization treatment device is configured to pass one of each of the separated polarization components of the wavelength of the optical signal to the two interferometers;
    wherein each of the two interferometers are communicatively coupled to one of the two power meters.

4. The device of claim 1,
    wherein the polarization treatment device comprises:
        a tunable polarization controller; and
        a fixed axis polarizer configured to separate one polarization component of the optical signal from the plurality of polarization components;
    wherein the wavelength treatment device is configured to select the one wavelength of the optical signal and pass the one wavelength to the polarization treatment device;
    wherein the polarization treatment device is configured to pass the separated polarization component of the wavelength of the optical signal to the first interferometer.

5. The device of claim 1, the OSNR monitor device further comprising at least two power meters and two interferometers;
    wherein the polarization treatment device comprises:
        a tunable polarization controller; and
        a polarization beam splitter configured to separate two polarization components from the optical signal;
    wherein the wavelength treatment device is configured to select the one wavelength of the optical signal and pass the one wavelength to the polarization treatment device;
    wherein the polarization treatment device is configured to pass one of each of the separated polarization components of the one wavelength of the optical signal to the at least two interferometers;
    wherein each of the at least two interferometers is communicatively coupled to one of the two power meters.

6. The device of claim 1,
    wherein the polarization treatment device comprises:
        a polarization stabilizer; and
        a fixed axis polarizer configured to separate one polarization component of the optical signal from the plurality of polarization components;
    wherein the wavelength treatment device is configured to select the one wavelength of the optical signal and pass the one wavelength to the polarization treatment device;
    wherein the polarization treatment device is configured to pass the separated polarization component of the wavelength of the optical signal to the first interferometer.

7. The device of claim 1, the OSNR monitor device further comprising at least two power meters and two interferometers;
    wherein the polarization treatment device comprises:
        a polarization beam splitter configured to split the optical signal; and
        at least two tunable polarizers, each configured to separate a different polarization component from the plurality of polarization components;
    wherein the wavelength treatment device is configured to select the one wavelength of the optical signal and pass the one wavelength to the polarization treatment device;
    wherein the polarization treatment device is configured to pass one of each of the different polarization components of the one wavelength of the optical signal to the at least two interferometers;

wherein each of the at least two delay interferometers is communicatively coupled to one of the two power meters.

8. The device of claim 1,
wherein the polarization treatment device comprises a tunable polarizer;
wherein the wavelength treatment device is configured to select the one wavelength of the optical signal and pass the one wavelength to the polarization treatment device;
wherein the polarization treatment device is configured to pass the separated polarization component of the wavelength of the optical signal to the first interferometer.

9. The device of claim 1, wherein the polarization treatment device is further configured to separate two polarization components from the plurality of polarization components in the optical signal, the wavelength treatment device further comprising a second interferometer such that the two polarizations have their OSNRs determined essentially simultaneously.

10. The device of claim 1, wherein determining the OSNR is governed by:

$$OSNR[\text{dB}] = 10 \times \log\left(\frac{P2 - P1}{1 - t}\right) - 10 \times \log\left[\left(P1 + P2 - \frac{P2 - P1}{1 - t}\right) \times \frac{0.1}{B}\right]$$

wherein "B" denotes bandwidth, "t" denotes a product of delay time and bit rate, "P1" and "P2" denote the powers of the optical signal, and "OSNR" denotes optical signal-to-noise ratio.

11. The device of claim 1, wherein the controller comprises:
a data processing component configured to determine OSNR; and
a controlling component configured to direct modifiable features of the polarization treatment device and the wavelength treatment device.

12. A device for measuring optical signal-to-noise ratio (OSNR) of an optical signal comprising a plurality of polarization components and a plurality of wavelengths, the device comprising:
a polarization treatment device configured to separate a first and second polarization component from the plurality of polarization components in the optical signal;
a wavelength selective switch configured to:
receive the one polarization component of the optical signal;
select one wavelength from the plurality of wavelengths in the one polarization component of the optical signal;
delay a first portion of the first polarization component of the one wavelength of the optical signal;
shift a phase of the first portion by a first amount and the first amount plus pi radians;
cause the first portion to interfere with a second portion of the one polarization component of the one wavelength of the optical signal; and
output interference of the first portion and second portion;
a power meter configured to:
receive the output of the wavelength selective switch; and
measure a power of the output of the wavelength selective switch; and
a controller configured to:
receive the measured power of the output of the wavelength selective switch; and
determine OSNR of the one wavelength of the first polarization component of the optical signal by comparing the power of the output of the wavelength selective switch when the wavelength selective switch shifts the phase by the first amount with the output of the wavelength selective switch when the wavelength selective switch shifts the phase by the first amount plus pi radians;
wherein the wavelength selective switch is further configured to receive the second polarization component and determine the OSNR of the one wavelength of the second polarization component of the optical signal in parallel; and
wherein the first polarization component and the second polarization component each carry distinct information.

13. The device of claim 12, wherein the wavelength selective switch is configured to provide two outputs, the outputs comprising one of constructive interference or destructive interference.

14. The device of claim 12,
wherein the polarization treatment device comprises:
a tunable polarization controller; and
a fixed axis polarizer configured to separate one polarization component of the optical signal from the plurality of polarization components;
wherein the polarization treatment device is configured to pass the separated polarization component of the optical signal to the wavelength selective switch.

15. The device of claim 12,
wherein the polarization treatment device comprises a tunable polarization controller configured to separate a polarization component from a plurality of polarization components of the optical signal;
wherein the polarization treatment device is configured to pass the separated polarization component of the optical signal to the wavelength selective switch.

16. The device of claim 12,
wherein the polarization treatment device comprises:
a polarization stabilizer; and
a fixed axis polarizer configured to separate one polarization component of the optical signal from the plurality of polarization components;
wherein the polarization treatment device is configured to pass the separated polarization component of the optical signal to the wavelength selective switch.

17. The device of claim 12, wherein determining the OSNR is governed by:

$$OSNR[\text{dB}] = 10 \times \log\left(\frac{P2 - P1}{1 - t}\right) - 10 \times \log\left[\left(P1 + P2 - \frac{P2 - P1}{1 - t}\right) \times \frac{0.1}{B}\right]$$

wherein "B" denotes bandwidth, "t" denotes a product of delay time and bit rate, "P1" and "P2" denote the powers of the optical signal, and "OSNR" denotes optical signal-to-noise ratio.

18. The device of claim 12, wherein the controller comprises:
a data processing component configured to determine the signal-to-noise ratio; and
a controlling component configured to direct modifiable features of the polarization treatment device and the wavelength selective switch.

19. A method of determining optical signal-to-noise ratio (OSNR) of an optical signal comprising a plurality of wavelengths and a plurality of polarization components, the method comprising:
separating a first and second polarization component from the plurality of polarization components in the optical signal at a polarization treatment device;
selecting one wavelength from the plurality of wavelengths in the optical signal at a wavelength treatment device;

delaying a first portion of the first polarization component of the one wavelength of the optical signal;
shifting a phase of the first portion by a first amount;
causing the first portion to interfere with a second portion of the first polarization component of the one wavelength of the optical signal;
measuring a power of the interference of the first and second portions of the first polarization component of the one wavelength of the optical signal at a power meter;
receiving at a controller the power of the interference;
delaying the first portion of the first polarization component of the one wavelength of the optical signal;
shifting the phase of the first portion by the first amount plus pi radians;
causing the first portion to interfere with the second portion of the first polarization component of the one wavelength of the optical signal;
measuring the power of the interference of the first and second portions of the first polarization component of the one wavelength of the optical signal at the power meter;
receiving at the controller the power of the interference;
determining OSNR by comparing the power of the interference when the phase is shifted by the first amount with the interference when the phase is shifted by the first amount plus pi radians; and
receiving the second polarization component and determining the OSNR of the one wavelength of the second polarization component of the optical signal in parallel;
wherein the first polarization component and the second polarization component each carry distinct information.

20. The method of claim 19,
wherein the wavelength treatment device comprises a tunable band pass filter;
wherein the delaying, causing, and shifting steps are performed by an interferometer.

21. The method of claim 20,
wherein the polarization treatment device comprises:
a tunable polarization controller; and
a polarization beam splitter;
wherein the tunable band pass filter is configured to select the one wavelength of the optical signal and pass the one wavelength to the polarization treatment device;
wherein the polarization treatment device is configured to pass one of each of the separated polarization components of the wavelength of the optical signal to two interferometers;
wherein each of the at least two interferometers are configured to provide their outputs to at least one of at least two power meters.

22. The method of claim 20,
wherein the polarization treatment device comprises:
a tunable polarization controller; and
a fixed axis polarizer configured to separate one polarization component of the optical signal from the plurality of polarization components;
wherein the tunable band pass filter is configured to select the one wavelength of the optical signal and pass the one wavelength to the polarization treatment device;
wherein the polarization treatment device is configured to pass the separated polarization component of the wavelength of the optical signal to the interferometer;
wherein the interferometer is configured to provide its output to the power meter.

23. The method of claim 20,
wherein the polarization treatment device comprises:
a tunable polarization controller; and
a polarization beam splitter configured to separate two polarization components from the optical signal;
wherein the tunable band pass filter is configured to select the one wavelength of the optical signal and pass the one wavelength to the polarization treatment device;
wherein the polarization treatment device is configured to pass one of each of the separated polarization components of the one wavelength of the optical signal to at least two interferometers;
wherein each of the at least two interferometers are configured to provide their outputs to at least one of at least two power meters.

24. The method of claim 20,
wherein the polarization treatment device comprises:
a polarization stabilizer; and
a fixed axis polarizer configured to separate one polarization component of the optical signal from the plurality of polarization components;
wherein the tunable band pass filter is configured to select the one wavelength of the optical signal and pass the one wavelength to the polarization treatment device;
wherein the polarization treatment device is configured to pass the separated polarization component of the wavelength of the optical signal to the interferometer;
wherein the interferometer is configured to provide its output to the power meter.

25. The method of claim 20,
wherein the polarization treatment device comprises:
a polarization beam splitter configured to split the optical signal; and
at least two tunable polarizers, each configured to separate a different polarization component from the plurality of polarization components;
wherein the tunable band pass filter is configured to select the one wavelength of the optical signal and pass the one wavelength to the polarization treatment device;
wherein the polarization treatment device is configured to pass one of each of the different polarization components of the one wavelength of the optical signal to at least two interferometers;
wherein each of the at least two interferometers are configured to provide their outputs to at least one of at least two power meters.

26. The method of claim 20,
wherein the polarization treatment device comprises a tunable polarizer;
wherein the tunable band pass filter is configured to select the one wavelength of the optical signal and pass the one wavelength to the polarization treatment device;
wherein the polarization treatment device is configured to pass the separated polarization component of the wavelength of the optical signal to the interferometer;
wherein the interferometer is configured to provide its output to the power meter.

27. The method of claim 19, wherein the wavelength treatment device comprises a wavelength selective switch and the delaying, causing, and shifting steps are performed by the wavelength selective switch.

28. The method of claim 27, wherein the wavelength selective switch is configured to provide two outputs, the outputs comprising one of constructive interference or destructive interference.

29. The method of claim 27,
wherein the polarization treatment device comprises:
a tunable polarization controller; and
a fixed axis polarizer configured to separate one polarization component of the optical signal from the plurality of polarization components;

wherein the polarization treatment device is configured to pass the separated polarization component of the optical signal to the wavelength selective switch;

wherein the wavelength selective switch is configured to perform the selecting step.

30. The method of claim 27, wherein the polarization treatment device comprises a tunable polarization controller configured to separate a polarization component from a plurality of polarization components of the optical signal;

wherein the polarization treatment device is configured to pass the separated polarization component of the optical signal to the wavelength selective switch;

wherein the wavelength selective switch is configured to perform the selecting step.

31. The method of claim 27, wherein the polarization treatment device comprises:
 a polarization stabilizer; and
 a fixed axis polarizer configured to separate one polarization component of the optical signal from the plurality of polarization components;

wherein the polarization treatment device is configured to pass the separated polarization component of the optical signal to the wavelength selective switch;

wherein the wavelength selective switch is configured to perform the selecting step.

32. The method of claim 19, wherein determining the signal-to-noise ratio is governed by:

$$OSNR[\text{dB}] = 10 \times \log\left(\frac{P2 - P1}{1 - t}\right) - 10 \times \log\left[\left(P1 + P2 - \frac{P2 - P1}{1 - t}\right) \times \frac{0.1}{B}\right]$$

wherein "B" denotes bandwidth, "t" denotes a product of delay time and bit rate, "P1" and "P2" denote the powers of the optical signal, and "OSNR" denotes optical signal-to-noise ratio.

* * * * *